(12) United States Patent
Hegna

(10) Patent No.: US 10,073,183 B2
(45) Date of Patent: Sep. 11, 2018

(54) METHODS AND SYSTEMS THAT ATTENUATE NOISE IN SEISMIC DATA

(71) Applicant: PGS Geophysical AS, Oslo (NO)

(72) Inventor: Stian Hegna, Oslo (NO)

(73) Assignee: PGS Geophysical AS, Oslo (NO)

(*) Notice: Subject to any disclaimer, the term of this patent is extended or adjusted under 35 U.S.C. 154(b) by 414 days.

(21) Appl. No.: 14/820,415

(22) Filed: Aug. 6, 2015

(65) Prior Publication Data

US 2016/0109594 A1 Apr. 21, 2016

Related U.S. Application Data

(60) Provisional application No. 62/065,910, filed on Oct. 20, 2014.

(51) Int. Cl.
*G01V 1/36* (2006.01)
*G01V 1/32* (2006.01)
*G01V 1/38* (2006.01)

(52) U.S. Cl.
CPC ............... *G01V 1/36* (2013.01); *G01V 1/32* (2013.01); *G01V 1/325* (2013.01); *G01V 1/38* (2013.01); *G01V 2210/242* (2013.01); *G01V 2210/32* (2013.01); *G01V 2210/34* (2013.01); *G01V 2210/43* (2013.01); *G01V 2210/44* (2013.01)

(58) Field of Classification Search
CPC . G01V 1/325; G01V 1/36; G01V 1/38; G01V 2210/242; G01V 2210/44; G01V 2210/32; G01V 2210/43; G01V 2210/34
See application file for complete search history.

(56) References Cited

U.S. PATENT DOCUMENTS

| 3,676,841 A | 7/1972 | Antsey |
| 4,458,339 A | 7/1984 | Wason |
| 5,189,642 A | 2/1993 | Donoho et al. |
| 5,572,483 A * | 11/1996 | Chambers .............. G01V 1/364 367/21 |
| 5,682,357 A | 10/1997 | Rigsby |
| 5,761,152 A | 6/1998 | Jacobsen et al. |
| 6,188,962 B1 | 2/2001 | Morgan et al. |

(Continued)

FOREIGN PATENT DOCUMENTS

| WO | 2014/158387 A2 | 10/2014 |
| WO | 2015/145261 A2 | 10/2015 |

OTHER PUBLICATIONS

Search Report under Section 17, Application No. GB1518274.4, dated Apr. 11, 2016.

(Continued)

*Primary Examiner* — Krystine E Breier

(57) ABSTRACT

Methods and systems that attenuate noise in seismic data. In one aspect, noise attenuation methods iteratively generate a low-speed noise model of low-speed noise recorded in the seismic data. The seismic data is arranged into a sparse seismic-data matrix. Low-speed noise refers to noise that propagates at speeds less the speed of sound in water. The low-speed noise model includes the low-speed noise and includes interpolated low-speed noise that approximates portions of the low-speed noise typically affected by spatial aliasing and streamer surface irregularities. The low-speed noise model may be subtracted from the sparse seismic-data matrix to obtain a noise-attenuated sparse seismic-data matrix.

35 Claims, 26 Drawing Sheets

(56) References Cited

U.S. PATENT DOCUMENTS

| | | |
|---|---|---|
| 6,327,537 B1 | 12/2001 | Ikelle |
| 6,906,981 B2 | 6/2005 | Vaage |
| 6,914,433 B2 | 7/2005 | Wright et al. |
| 7,391,673 B2 | 6/2008 | Regone et al. |
| 7,502,690 B2 | 3/2009 | Thomsen et al. |
| 7,679,990 B2 | 3/2010 | Herkenhoff et al. |
| 7,733,740 B2 | 6/2010 | Hillesund et al. |
| 7,773,456 B2 | 8/2010 | Hornby |
| 7,941,273 B2 | 5/2011 | Thomsen et al. |
| 7,985,589 B2 | 7/2011 | Ray et al. |
| 8,000,168 B2 | 8/2011 | Eick et al. |
| 8,004,931 B2 | 8/2011 | Eick et al. |
| 8,014,229 B2 | 9/2011 | Meunier et al. |
| 8,280,695 B2 | 10/2012 | Neelamani et al. |
| 8,295,124 B2 | 10/2012 | Abma |
| 8,345,510 B2 | 1/2013 | Hegna et al. |
| 8,456,950 B2 | 6/2013 | Hegna |
| 8,553,496 B2 | 10/2013 | Decker et al. |
| 8,559,270 B2 | 10/2013 | Abma |
| 8,600,680 B2 | 12/2013 | Parkes et al. |
| 8,619,497 B1 * | 12/2013 | Sallas ............... G01V 1/38 367/23 |
| 8,724,428 B1 | 5/2014 | Sallas |
| 8,837,255 B2 | 9/2014 | Ross et al. |
| 9,001,618 B2 | 4/2015 | Hegna |
| 8,942,060 B2 | 7/2015 | Abma et al. |
| 2004/0232917 A1 | 11/2004 | Wright et al. |
| 2004/0257913 A1 | 12/2004 | Ray et al. |
| 2007/0268781 A1 | 11/2007 | Meunier et al. |
| 2008/0049550 A1 | 2/2008 | Fleure et al. |
| 2009/0135671 A1 | 5/2009 | Meunier |
| 2009/0323472 A1 | 12/2009 | Howe |
| 2010/0039894 A1 | 2/2010 | Abma |
| 2010/0165792 A1 | 7/2010 | Stenzel et al. |
| 2010/0299070 A1 | 11/2010 | Abma |
| 2011/0079461 A1 | 4/2011 | Allen et al. |
| 2011/0128818 A1 | 6/2011 | Eick et al. |
| 2011/0194378 A1 | 8/2011 | Decker et al. |
| 2012/0014212 A1 | 1/2012 | Eick et al. |
| 2012/0014213 A1 | 1/2012 | Eick et al. |
| 2012/0033526 A1 | 2/2012 | Hegna et al. |
| 2012/0035853 A1 | 2/2012 | Eick et al. |
| 2012/0039150 A1 | 2/2012 | Eick et al. |
| 2012/0051181 A1 | 3/2012 | Eick et al. |
| 2012/0147699 A1 | 6/2012 | Dellinger et al. |
| 2012/0155217 A1 | 6/2012 | Dellinger et al. |
| 2012/0176861 A1 | 7/2012 | Abma et al. |
| 2012/0281499 A1 | 11/2012 | Eick et al. |
| 2013/0028051 A1 | 1/2013 | Barkved et al. |
| 2013/0088938 A1 | 4/2013 | Aaron et al. |
| 2013/0121109 A1 | 5/2013 | Baardman et al. |
| 2013/0121110 A1 * | 5/2013 | Trad ............... G01V 1/364 367/63 |
| 2013/0135966 A1 | 5/2013 | Rommel et al. |
| 2013/0163381 A1 | 6/2013 | Sallas |
| 2013/0176819 A1 | 7/2013 | Poole |
| 2013/0201791 A1 | 8/2013 | Parkes et al. |
| 2013/0325427 A1 | 12/2013 | Hegna et al. |
| 2014/0016436 A1 | 1/2014 | Söllner et al. |
| 2014/0036060 A1 | 2/2014 | Claussen et al. |
| 2014/0140168 A1 | 5/2014 | Howe |
| 2014/0153363 A1 | 6/2014 | Juhasz et al. |
| 2014/0198607 A1 | 7/2014 | Etienne et al. |
| 2014/0269182 A1 | 9/2014 | Parkes et al. |
| 2014/0301162 A1 | 10/2014 | Mensch et al. |
| 2014/0303898 A1 | 10/2014 | Poole |
| 2015/0057938 A1 | 2/2015 | Krohn et al. |
| 2015/0078128 A1 | 3/2015 | Eick et al. |
| 2015/0109882 A1 * | 4/2015 | Rentsch-Smith ...... G01V 1/364 367/14 |
| 2016/0109591 A1 * | 4/2016 | Kamil Amin .......... G01V 1/366 367/21 |

OTHER PUBLICATIONS

Abma, Ray and Kabir, Nurul, "3D interpolation of irregular data with a POCS algorithm," pp. E91-E97, Geophysics, vol. 71, No. 6, Nov.-Dec. 2006.

Yu et al., "Flexible Surface Multiple Attenuation Using the Curvelet Transform", SEG San Antonio 2011 Annual Meeting, pp. 3485-3489.

* cited by examiner

METHODS AND SYSTEMS THAT ATTENUATE NOISE IN SEISMIC DATA

CROSS-REFERENCE TO A RELATED APPLICATION

This application claims the benefit of Provisional Application 62/065,910, filed Oct. 20, 2014.

BACKGROUND

In recent years, the petroleum industry has invested heavily in the development of improved marine survey techniques and seismic data processing methods in order to increase the resolution and accuracy of seismic images of subterranean formations. Marine surveys illuminate a subterranean formation located beneath a body of water with acoustic energy produced by one or more submerged seismic sources. A source may be composed of an array of source elements, such as air guns or marine vibrators. The acoustic energy may travel down through the water and into the subterranean formation. At each interface between different types of rock or sediment of the subterranean formation a portion of the acoustic energy may be refracted, a portion may be transmitted, and a portion may be reflected back toward the subterranean formation surface and into the body of water. A typical marine survey is carried out with a survey vessel that passes over the illuminated subterranean formation while towing elongated cable-like structures called streamers. Some marine surveys utilize receivers attached to ocean bottom nodes or cables, either in conjunction with, or in lieu of, receivers on towed streamers. The streamers may be equipped with a number of collocated, pressure and particle motion sensors that detect pressure and particle motion wavefields, respectively, associated with the acoustic energy reflected back into the water from the subterranean formation. The pressure sensors generate seismic data that represents the pressure wavefield and the particle motion sensors generate seismic data that represents the particle motion (e.g., particle displacement, particle velocity, or particle acceleration) wavefield.

In general, seismic data is composed of signal and noise. The signal contains the desired information, and the noise is any recorded acoustic and non-acoustic energy that reduces the quality of the signal. Noise attenuation is an important part of preparing the seismic data for further seismic data processing to generate high-quality images of a subterranean formation. However, separating signal from noise remains a challenge, because noise is often produced by a wide variety of different noise sources. Those working in the petroleum industry seek efficient methods and systems that may be used to attenuate noise in seismic data.

DETAILED DESCRIPTION

This disclosure is directed to methods and systems that attenuate noise in seismic data. The seismic data may be recorded in separate shot records while a survey vessel travels above a subterranean formation. A typical shot record may be created by activating source elements at the same time or, alternatively, at different times within a short activation time interval (e.g., about 1-3 seconds) and recording the subterranean formation response to the acoustic energy generated by the source elements in a longer recording time interval (e.g., about 8-12 seconds). Alternatively, the seismic data may be near-continuously recorded while the survey vessel moves along a vessel track with source elements activated with generalized activation times and at generalized locations. As a result, the distances traveled between activating the source elements may be more varied than when source elements are activated to generate a shot record, and near-continuously recorded seismic data is not restricted by spectral constraints of one particular configuration of source elements and by the distance traveled between activation times of source elements.

Noise attenuation methods described herein may be used to attenuate noise in either a shot record or near-continuously recorded seismic data. As used herein, "continuously recorded", "near-continuously recorded", "recording continuously", or "recording near-continuously" indicate that a receiver is actively recording seismic data over a period of time that is significantly (at least 5 times as much) longer than the typical time for activation and detection of a primary signal from an impulse source (sometimes referred to as "shot time"). Thus, a receiver may be operated "near-continuously" by recording seismic data during portions of the marine survey, while still not recording seismic data during other portions (e.g., during turning of the survey vessel, during unplanned equipment downtime, etc.). In particular, the noise attenuations methods described herein iteratively generate a low-speed noise model of low-speed noise contained in the seismic data. Low-speed noise refers to noise that propagates at speeds less than the speed of sound in water. The low-speed noise model includes the low-speed noise and interpolated low-speed noise that approximates portions of the low-speed noise typically affected by spatial aliasing and surface irregularities. The low-speed noise model may be subtracted from the seismic data to obtain a noise-attenuated seismic data.

Figure 1A:
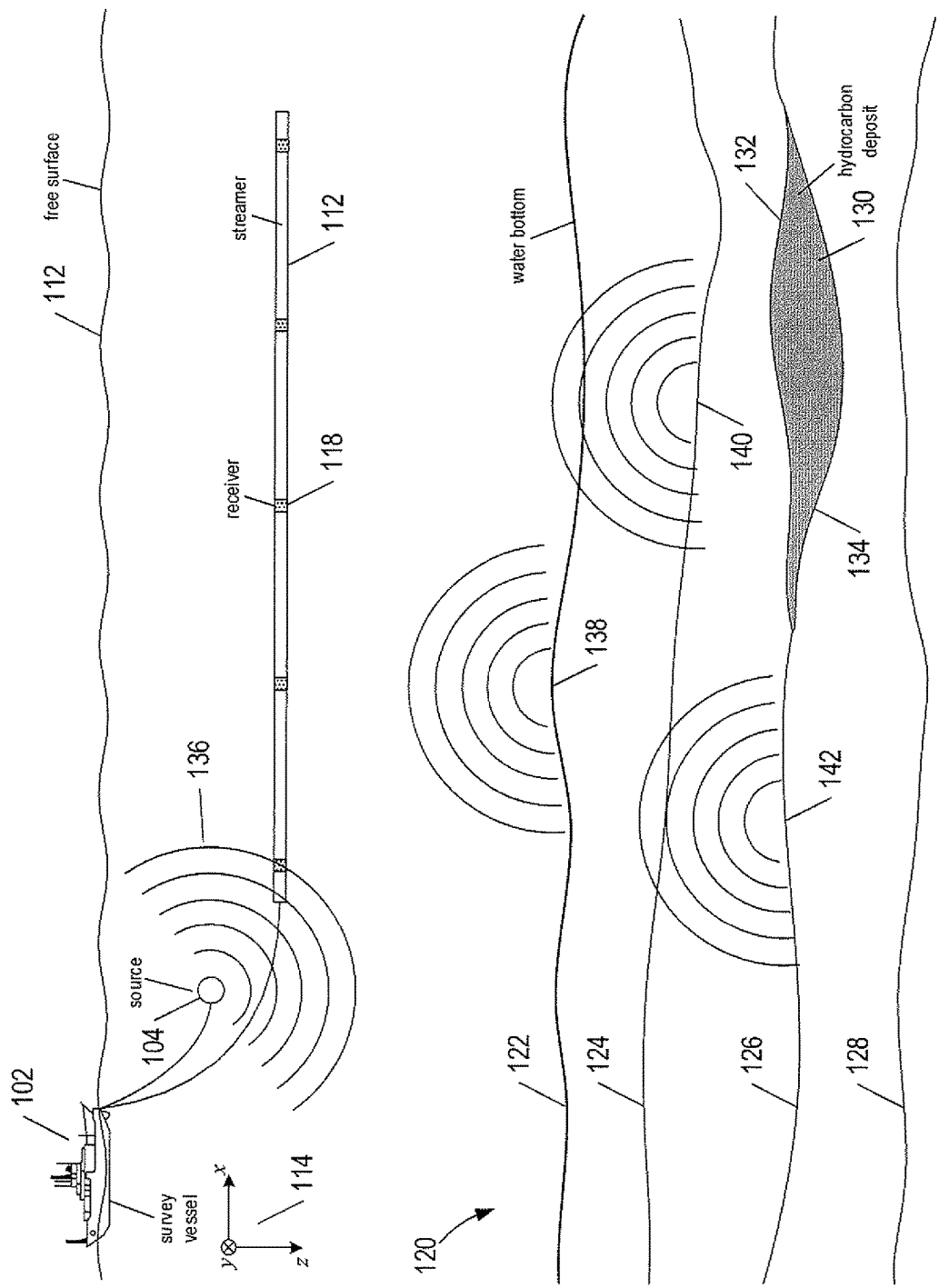
FIGS. 1A-1B show side-elevation and top views of an example seismic data acquisition system.
Figure 1B:
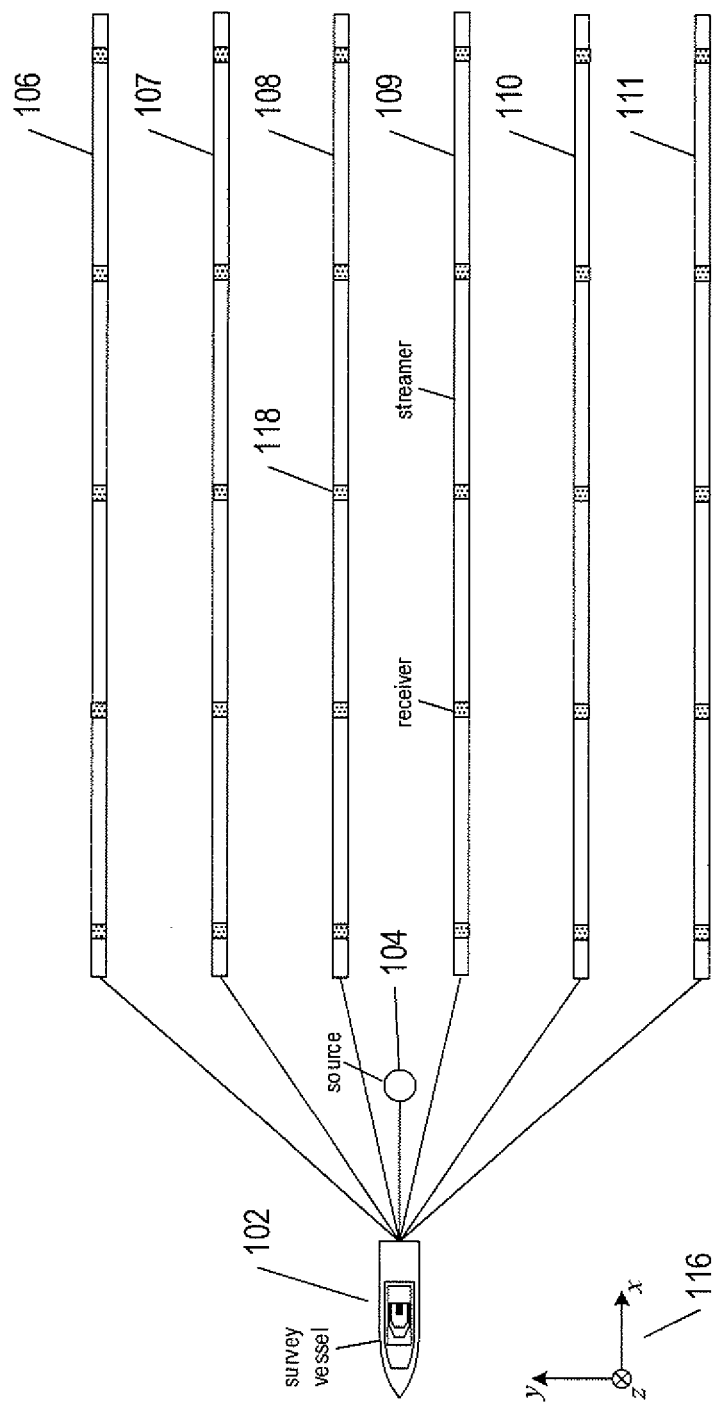

FIGS. 1A-1B show side-elevation and top views, respectively, of an example seismic data acquisition system composed of a survey vessel 102 towing a source 104 and six separate streamers 106-111 beneath a free surface 112 of a body of water. The body of water can be, for example, an ocean, a sea, a lake, or a river, or any portion thereof. In this example, each streamer is attached at one end to the survey vessel 102 via a data transmission cable. The illustrated streamers 106-111 form a planar horizontal data acquisition surface with respect to the free surface 112. However, in practice, the data acquisition surface may be smoothly varying due to active sea currents and weather conditions. In other words, although the streamers 106-111 are illustrated in FIGS. 1A and 1B and subsequent figures as straight and substantially parallel to the free surface 112, in practice, the towed streamers may undulate as a result of dynamic conditions of the body of water in which the streamers are submerged. A data acquisition surface is not limited to having a planar horizontal orientation with respect to the free surface 112. The streamers may be towed at depths that angle the data acquisition surface with respect to the free surface 112, or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers. It should also be noted that the number of sources is not limited to a single source. In practice, the number of sources selected to generate acoustic energy may range from as few as one source to three or more sources and the sources may be towed in groups by one or more vessels.

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers (or a specified portion thereof when the length of the streamers are curved) and is referred to as the "in-line" direction. The y-direction specifies the position of a point in a direction perpendicular to the x-axis and substantially parallel to the free surface 112 and is referred to as the "cross-line" direction. The z-direction specifies the position of a point perpendicular to the xy-plane (i.e., perpendicular to the free surface 112) with the positive z-direction pointing downward away from the free surface 112. The streamers 106-111 are long cable-like structures containing power and data-transmission lines that connect receivers, represented by shaded rectangles, such as receiver 118, spaced-apart along the length of each streamer, to seismic data acquisition equipment and data-storage devices located on board the survey vessel 102.

In certain marine surveys, receivers may be attached to ocean bottom nodes or cables, either in conjunction with, or in lieu of, receivers on towed streamers. For the sake of clarity, the description and illustrations will discuss receivers on towed streamers, but method describe below are not limited to towed streamer and may be used with seismic data acquired using ocean bottom nodes or cables.

Streamer depth below the free surface 112 can be estimated at various locations along the streamers using depth-measuring devices (e.g., attached to the streamers). For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300 meter intervals in some implementations) along each streamer. Note that in other implementations buoys may be attached to the streamers and used to maintain the orientation and depth of the streamers below the free surface 112.

FIG. 1A shows a cross-sectional view of the survey vessel 102 towing the source 104 above a subterranean formation 120. Curve 122, the formation surface, represents a top surface of the subterranean formation 120 located at the bottom of the body of water. The subterranean formation 120 may be composed of a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine survey. As the survey vessel 102 moves over the subterranean formation 120, the source 104 may be activated to produce acoustic energy at spatial and/or temporal intervals. The shape, depth, and extent of the subterranean hydrocarbon deposit 130 may be better ascertained from the response of subterranean formation 120 to the acoustic energy produced by source 104. Activation of the source 104 is often called as a "shot." In other implementations, the source 104 may be towed by one survey vessel and the streamers may be towed by a different survey vessel. The source 104 may be an impulse source (e.g. air gun), a non-impulse source (e.g., marine vibrator), or composed of an array of impulse and/or non-impulse sources. FIG. 1A illustrates a source wavefield expanding outward from the source 104 as a pressure wavefield 136 represented by semicircles of increasing radius centered at the source 104. The outwardly expanding wavefronts from the source 104 may be spherical but are shown in vertical plane cross section in FIG. 1A. The outward and downward expanding portion of the pressure wavefield 136 and portion of the pressure wavefield 136 reflected from the free surface 112 are called the "source wavefield." The source wavefield eventually reaches the formation surface 122 of the subterranean formation 120, at which point the source wavefield may be partially reflected from the formation surface 122 and partially refracted downward into the subterranean formation 120, becoming elastic waves within the subterranean formation 120. In other words, in the body of water, the source wavefield is composed primarily of compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic energy may emanate upward (toward the receivers 118) and downward. As shown in FIG. 1A, waves of significant amplitude may be generally reflected from points on or close to the formation surface 122, such as point 138, and from points on or very close to interfaces in the subterranean formation 120, such as points 140 and 142. The upward expanding waves reflected from the subterranean formation 120 are collectively the "reflected wavefield."

The waves that compose the reflected wavefield may be generally reflected at different times within a range of times following the initial shot. A point on the formation surface 122, such as the point 138, may receive a pressure disturbance from the source wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which secondary and higher-order waves are reflected from various points within the subterranean formation 120 may be related to the distance, in three-dimensional space, of the points from the activated source.

Acoustic and elastic waves, however, may travel at different velocities within different materials as well as within the same material under different pressures. Therefore, the travel times of the source wavefield and reflected wavefield may be functions of distance from the source 104 as well as the composition and physical characteristics of the materials through which the wavefields travel. In addition, the secondary expanding wavefronts may be altered as the wavefronts cross interfaces and as the velocity of sound varies in the media are traversed by the wavefield. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists (e.g., hydrocarbon deposit 130).

Figure 2:
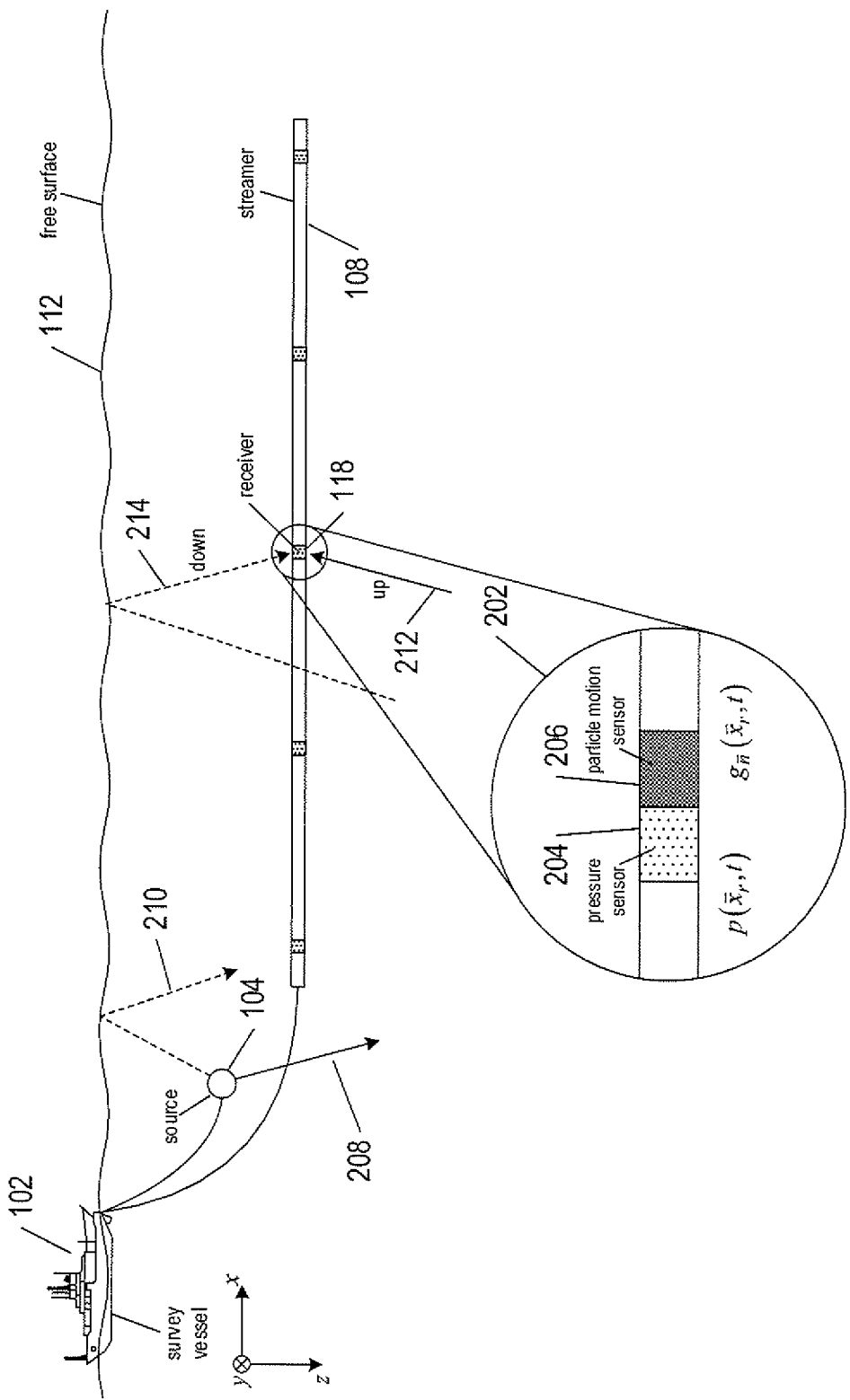
FIG. 2 shows a side-elevation view of seismic data acquisition system with a magnified view of a receiver.

Each receiver 118 may be a pressure sensor, a particle motion sensor, a multi-component sensor (including particle motion sensors and/or a pressure sensor), or any combination thereof. A pressure sensor detects variations in water pressure over time. The term "particle motion sensor" is a general term used to refer to a sensor that may be configured to detect particle motion (e.g., particle displacement, particle velocity, or particle acceleration) over time. FIG. 2 shows a side-elevation view of the seismic data acquisition system with a magnified view 202 of the receiver 118. In this example, the magnified view 202 reveals that the receiver 118 is a multi-component sensor composed of a pressure sensor 204 and a particle motion sensor 206. The pressure sensor may be, for example, a hydrophone. Each pressure sensor may measure changes in hydrostatic pressure over time to produce pressure data denoted by $p(\vec{x}^r,t)$, where $\vec{x}^r$ represents the Cartesian coordinates $(x^r,y^r,z^r)$ of a receiver, superscript $r$ is a receiver index, and $t$ represents time. The particle motion sensors may be responsive to water particle motion. In general, particle motion sensors detect particle motion in a direction normal to the orientation of the particle motion sensor and may be responsive to such directional displacement of the particles, velocity of the particles, or acceleration of the particles. A particle motion sensor that measures particle displacement generates particle displacement data denoted by $g_{\vec{n}}(\vec{x}^r,t)$, where the vector $\vec{n}$ represents the direction along which particle displacement is measured. A particle motion sensor that measures particle velocity (i.e., particle velocity sensor) generates particle velocity data denoted by $v_{\vec{n}}(\vec{x}^r,t)$. A particle motion sensor that measures particle acceleration (i.e., accelerometer) generates particle acceleration data denoted by $a_{\vec{n}}(\vec{x}^r,t)$. The data generated by one type of particle motion sensor may be converted to another type. For example, particle displacement data may be differentiated to obtain particle velocity data, and particle acceleration data may be integrated to obtain particle velocity data.

The particle motion sensors are typically oriented so that the particle motion is measured in the vertical direction (i.e., $\vec{n}=(0,0,z)$) in which case $g_{\vec{n}}(\vec{x}^r,t)$ is called vertical displacement data, $v_z(\vec{x}^r,t)$ is called vertical velocity data, and $a_z(\vec{x}^r,t)$ is called vertical acceleration data. Alternatively, each receiver may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor that measures particle velocity in the z-direction to give $v_z(\vec{x}^r,t)$, each receiver may include a particle motion sensor that measures the wavefield in the in-line direction in order to obtain the inline velocity data, $v_x(\vec{x}^r,t)$, and a particle motion sensor that measures the wavefield in the cross-line direction in order to obtain the cross-line velocity data, $v_y(\vec{x}^r,t)$. In certain implementations, the receivers may by composed of only pressure sensors, and in other implementations, the receivers may be composed of only particle motion sensors.

The streamers 106-111 and the survey vessel 102 may include sensing electronics and seismic data processing facilities that allow seismic data generated by each receiver to be correlated with the time the source 104 is activated, absolute positions on the free surface 112, and absolute three-dimensional positions with respect to an arbitrary three-dimensional coordinate system. The pressure data and particle displacement data may be stored at the receiver, and/or may be sent along the streamers and data transmission cables to the survey vessel 102, where the data may be stored electronically or magnetically on data-storage devices located onboard the survey vessel 102. The pressure data represents a pressure wavefield, particle displacement data represents a particle displacement wavefield, particle velocity data represents a particle velocity wavefield, and particle acceleration data represents particle acceleration wavefield. The particle displacement, velocity, and acceleration wavefields are referred to as particle motion wavefields.

Returning to FIG. 2, the free surface 112 of a body of water serves as a nearly perfect acoustic reflector, creating "ghost" effects that contaminate seismic data generated by the receivers 118. As described above with reference to FIG.

1, a source wavefield from the source 104 radiates outward in all directions, but a portion of the acoustic energy in the source wavefield travels generally downward from the source 104 to the subterranean formation as represented by directional arrow 208, and a portion travels upward to the free surface 112 before being reflected downward from the free surface 112 to the subterranean formation as represented by directional arrow 210. As a result, the reflected portion of the acoustic energy is time-delayed and trails the portion of the acoustic energy that travels directly from the source 104 into the subterranean formation. The trailing, time-delayed portion of the acoustic energy is called the "source ghost." Similarly, at each receiver 118, a time-delayed reflection from the free surface 112 called a "receiver ghost" interferes with the wavefield reflected directly from the subterranean formation to the streamer 108. Directional arrow 212 represents the direction of an up-going wavefield at receiver 118, and dashed-line arrow 214 represents a down-going wavefield produced by reflection of an up-going wavefield from the free surface 112 before reaching the receiver 118. In other words, the pressure wavefield measured by the receivers is composed of an up-going pressure wavefield component and a down-going pressure wavefield component, and the particle motion wavefield is composed of an up-going particle wavefield component and a down-going particle motion wavefield component. The down-going wavefield 214, also called the "receiver ghost wavefield," may interfere with the up-going wavefield 212, and may create "notches" (i.e., destructive interference) in the seismic data spectral domain. Both the up-going and down-going wavefields consist of reflected energy associated with the portion of the acoustic energy that travelled directly from the source to the subterranean formation and includes a time-delayed component associated with the source ghost.

Each pressure sensor and particle motion sensor may include an analog-to-digital converter that converts time-dependent analog data into discrete time series that consist of a number of consecutively measured values called "amplitudes" separated in time by a sample rate. The time series generated by a pressure or particle motion sensor is called a "trace," which may consist of thousands of samples collected at a typical sample rate of about 1 to 5 ms. A trace records variations in a time-dependent amplitude that represents acoustic energy in the portion of the reflected wavefield measured by the sensor. In particular, pressure data is the trace generated by a pressure sensor, and particle displacement data is the trace generated by a particle motion sensor. The coordinate location of each time sample generated by a moving sensor may be calculated from global position information obtained from one or more global positioning devices located along the streamers, survey vessel, and buoys, and the known geometry and arrangement of the streamers and sensors. In general, each trace is an ordered set of discrete spatial- and time-dependent pressure or motion sensor amplitudes denoted by:

$$tr(r) = \{c^r(x_j^r, y_j^r, t_j)\}_{j=1}^J \quad (1)$$

where
$c^r$ may represent pressure, particle displacement, particle velocity, or particle acceleration amplitude;
$(x_j^r, y_j^r)$ are spatial coordinates of the sensor at sample time $t_j$; and
superscript "r" indicates a receiver; and
J is the number of time samples in the trace.
Recorded data for each trace may also include a trace header not represented in Equation (1) that identifies the specific receiver that generated the trace, receiver GPS coordinates, and may include time sample rate and the number of samples.

As explained above, the reflected wavefield typically arrives first at the receivers located closest to the source. The distance from the source to a receiver is called the "source-receiver offset," or simply "offset.". A larger offset generally results in a longer arrival time delay. Seismic data may be composed of one or more traces collected to form a "gather" that can be further processed using various seismic data processing techniques in order to obtain information about the structure of the subterranean formation. A gather may be composed of traces generated by one or more pressure sensors, traces generated by one or more particle motion sensors, and any combination thereof.

Figure 3:
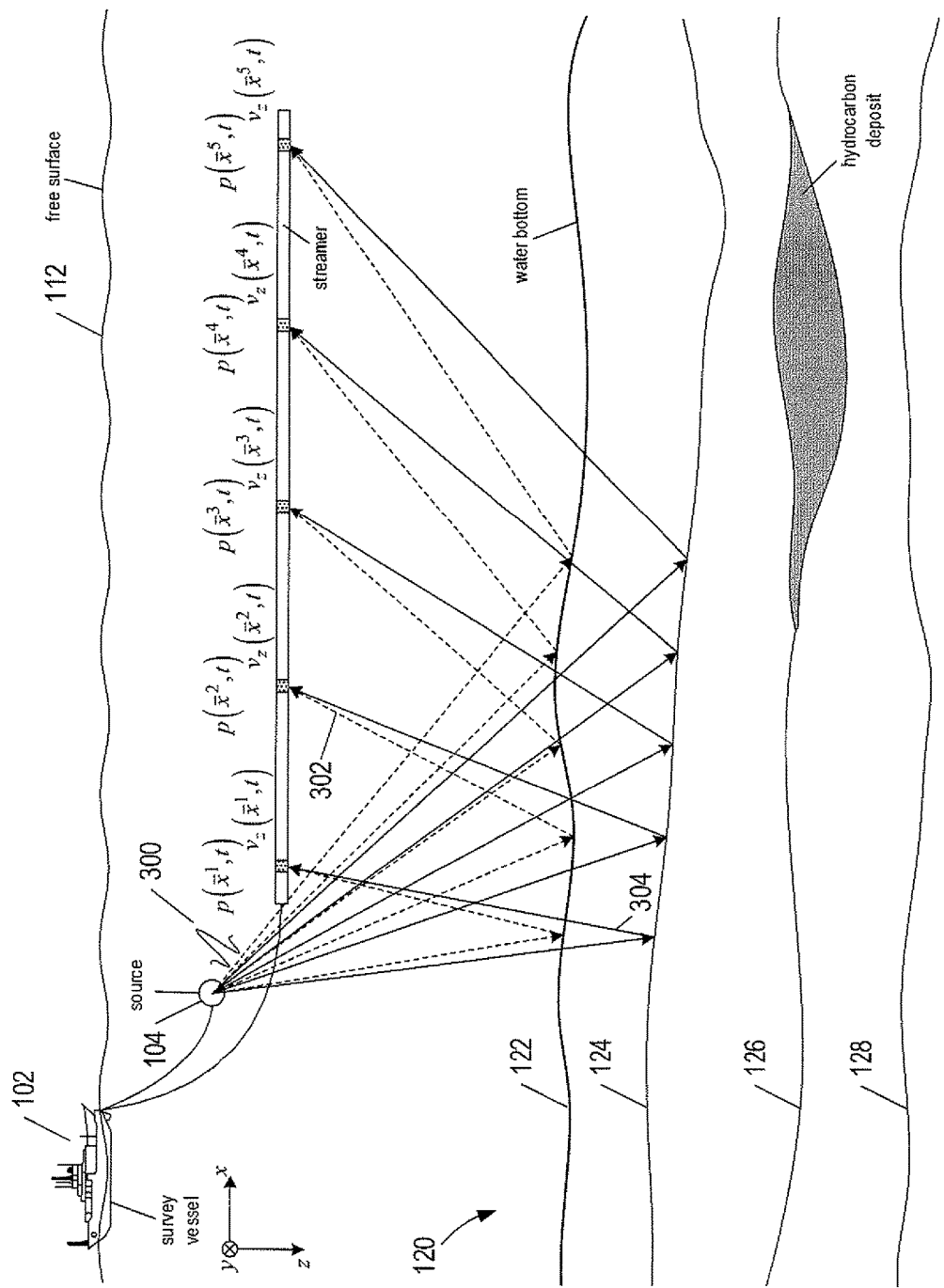
FIG. 3 shows an example of acoustic energy ray paths emanating from a source.

FIG. 3 shows example ray paths that represent paths a source wavefield 300 travels from the source 104 to and into the subterranean formation 120. Dashed-line rays, such as rays 302, represent acoustic energy reflected from the formation surface 122 to the receivers located along the streamer 108, and solid-line rays, such as rays 304, represent acoustic energy reflected from the interface 124 to the receivers located along the streamer 108. Note that for simplicity of illustration only a handful of ray paths are represented. Each pressure sensor may measure the pressure variations, and each particle motion sensor may measure the particle motion of the acoustic energy reflected from the formation surface 122 or subterranean formation interfaces 124, 126, 128. In the example of FIG. 3, the particle motion sensors located at each receiver measure vertical particle velocity of the wavefield emanating from the subterranean formation 120. Seismic data may be hydrostatic pressure data and/or particle motion data generated at each receiver. In the example of FIG. 3, the collection of traces generated by the receivers along the streamer 108 for a single activation of the source 104 may be collected to form a gather. The traces generated by the receivers located along each of the other five streamers for the same activation may be collected to form separate gathers, each associated with one of the streamers.

Figure 4:
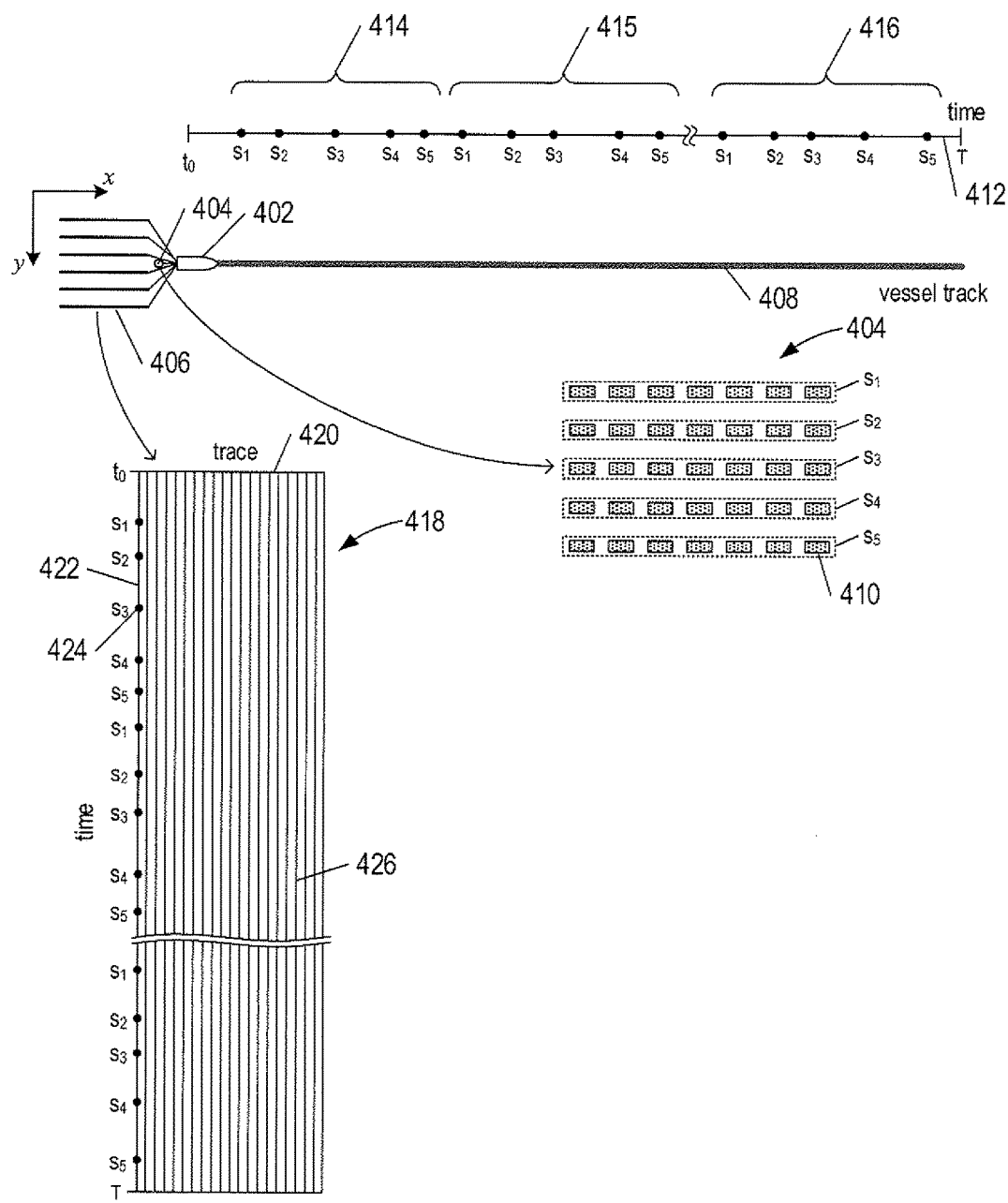
FIG. 4 shows an example of near-continuous seismic data recording.

FIG. 4 shows an example of near-continuous seismic data recording while a survey vessel moves along a vessel track of a marine survey with source elements activated with generalized activation times and at generalized locations along the vessel track. In FIG. 4, a survey vessel 402 tows six streamers 406 and a source 404 in the in-line direction along a vessel track 408. In this example, the source 404 is composed of a 5×7 array of source elements represented by shaded rectangles, such as shaded rectangle 410. The source elements comprising the source 404 are partitioned into five source element subsets denoted by $s_1$, $s_2$, $s_3$, $s_4$, and $s_5$. FIG. 4 also includes a time axis 412 with a start time $t_0$ that represents the time when near-continuous seismic data recording begins and a stop time T that represents when recording along the vessel track stops. With near-continuous seismic data recording, the source element subsets may be activated in a time-distributed manner throughout the time interval between $t_0$ and T. FIG. 4 shows an example of the source element subsets activated according to a repeated time-distributed sequence. Closed circles labeled $s_1$, $s_2$, $s_3$, $s_4$, and $s_5$ represent randomized or pseudo-randomized activation times for the source element subsets $s_1$, $s_2$, $s_3$, $s_4$, and $s_5$. The five source element subsets $s_1$, $s_2$, $s_3$, $s_4$, and $s_5$ are activated by repeating a time-distributed sequence indicated by brackets 415-416, in which source element subset $s_1$ is activated first followed by source element subset $s_2$, which is followed by source element subset $s_3$, which is followed by source element subset $s_4$, and source element subset $s_5$ activated last. After the last source element subset in the sequence has been activated, source element subset $s_5$, the sequence is repeated starting with the source element subset $s_1$. FIG. 4 represents a randomized or pseudo-randomized time-distributed sequence in which the sequential order is maintained but the activation times of the source element subsets, including the activation time of the source element subset $s_1$ following the activation time of the source element subset $s_5$, are randomized or pseudo-randomized. In another implementation, the sequential order in which the source element subsets are activated is maintained and the time intervals between activation times of the source element subsets, including the time interval between activation of the source element subset $s_1$ following activation of the source element subset $s_5$, may be fixed. In still another implementation, the sequential order in which the source element subsets are activated is maintained and the time interval between the activation times of the source element subsets may be fixed, but the activation time of the source element subset $s_1$ following activation of the source element subset $s_5$ may be randomized or pseudo-randomized. In other implementations, the source element subsets may be activated according to different time-distributed sequences. In other words, a subsequent time-distributed sequence may be different from a previously activated time-distributed sequence.

FIG. 4 additionally shows a gather 418 that represents a near-continuously recorded pressure or particle motion wavefield generated by pressure or particle motion sensors of the streamers 406 as the survey vessel 402 travels the vessel track 408. The gather includes a trace axis 420 and a time axis 422 that corresponds to the time axis 412 with times $t_0$ and T identifying the start and end of the near-continuously recorded seismic data record. Closed circles, such as closed circle 424, represents times when a source element subset was activated, and corresponds to the activation times identified along the time axis 412 while seismic data was near-continuously recorded. Each line in the gather 418, such as line 426, represents a single trace (wavelets not shown) near-continuously generated by the same pressure or particle motion sensor of the streamers 406 as the survey vessel 402 travels the length of the vessel track 408.

A gather of traces of near-continuously recorded seismic data produced by a set of pressure or particle motion sensors of a data acquisition surface towed by a survey vessel traveling along a vessel track is called a "near-continuous wavefield." In practice, any number of the traces forming a near-continuous wavefield may include breaks or blank places where no seismic data is recorded due to equipment stoppage, breakdown, or malfunction. For example, a near-continuous wavefield may have any number of traces with complete, uninterrupted time samples, while other traces in the same near-continuous wavefield may have breaks or blank places due to receiver perturbations and/or interruptions in data transmission from certain receivers to a data-storage device. The term "near-continuous wavefield" refers to both near-continuously recorded seismic data composed of time-sampled traces that have been reliably recorded without significant interruptions, and near-continuously recorded seismic data with any number of incomplete time-sampled traces.

Vessel tracks are not restricted to straight lines as shown in FIG. 4. Vessel tracks may be curved, circular or any other suitable non-linear path. In other words, receiver locations may vary in both the x- and y-coordinate locations as a survey vessel travels a non-linear vessel track. For example, in coil shooting surveys, a survey vessel travels in a series of overlapping, near-continuously linked circular, or coiled, vessel tracks. The circular geometry of the vessel tracks acquires a wide range of offset seismic data across various azimuths in order to sample the subterranean formation in many different directions. Weather conditions and changing currents may also cause a survey vessel to deviate from linear vessel tracks.

A near-continuous wavefield may be stored as a single data structure in a data-storage device located onboard a survey vessel or transmitted to and stored as a single data structure in an onshore data-storage device. However, a near-continuous wavefield recorded during a typical marine survey may be too large to store as a single data structure. For example, in addition to recording time sampled seismic data in each trace as the survey vessel travels along a vessel track, the coordinate location of each sensor may be recorded for each time sample (e.g., every 1 to 5 ms) over a long period of time as described above with reference to Equation (1). Because of the large volume of data associated with recording near-continuous wavefields, near-continuous wavefields may instead be partitioned into a series of smaller more manageable seismic-data structures called "component near-continuous wavefields."

Because seismic data is recorded near-continuously while traveling a vessel track, each trace of a near-continuous wavefield is a record of the wavefield measured at different locations along the vessel track. Methods apply a distance-correction operator to a near-continuous wavefield in order to correct for relative motion of the receivers by associating each time sample with the location where the time sample was measured. The distance-correction operator applied to the near-continuous wavefield generates a near-continuous wavefield in approximately stationary-receiver locations called a "near-continuous wavefield in approximately stationary-receiver locations." The near-continuous wavefield is corrected for moving sensors by first transforming the near-continuous wavefield from the space-time ("s-t") domain to the time-wavenumber ("t-k") domain using an fast Fourier transform ("FFT") or a discrete Fourier transform ("DFT"):

$$c^r(x_j^r, y_j^r, t_j) \rightarrow C^r(k_x, k_y, t_j) \qquad (2)$$

A general, two-dimensional distance-correction operator applied to a near-continuous wavefield obtained for a non-linear vessel track is given by:

$$O(k_x, k_y, t) = e^{-i(k_x \Delta x(t) + k_y \Delta y(t))} \qquad (3)$$

where
$i = \sqrt{-1}$;
$\Delta x(t_j) = x_j^r - x_0$;
$\Delta y(t_j) = y_j^r - y_0$;
$(x_0, y_0)$ are coordinates of the receiver at the start of the marine survey; and
$(x_j^r, y_j^r)$ are coordinates of the receiver at sample time $t_j$.
For a two-dimensional vessel track, the distance-correction operator is applied to each time sample of each trace of the near-continuous wavefield as follows:

$$C^r(k_x, k_y, t_j) O(k_x, k_y, t_j) = C^r(k_x, k_y, t_j) e^{-i(k_x \Delta x(t) + k_y \Delta y(t))} \qquad (4)$$

For a linear or one-dimensional vessel track, the y-coordinate direction (i.e., cross-line direction) may be omitted. Time samples of a near-continuous wavefield recorded for a one-dimensional vessel track are transformed from the s-t domain to the t-k domain using an FFT or a DFT:

$$c^r(x_j^r, t_j) \rightarrow C^r(k_x, t_j) \qquad (5)$$

and the distance-correction operator reduces to:

$$O(k_x,t)=e^{-ik_x\Delta x(t)} \qquad (6)$$

The distance-correction operator may be applied to each time sample of traces of the near-continuous wavefield in the t-k domain as follows:

$$C^r(k_x,t_j)O(k_x,t_j)=C^r(k_x,t_j)e^{-ik_x\Delta x(t_j)} \qquad (7)$$

The following pseudo-code represents applying the distance-correction operator in Equation (6) to a near-continuous wavefield obtained for a linear vessel track in the k-t domain:

```
1  for each k_x {
2      for (r = 1; r <=R; r++) {            \\ r is the trace index
3          for (j = 1; j <=J; j++) {         \\ j is the time sample index
4              read (C_r(k_x, t_j));
5              Δx(t_j) = x_j - x_0;
6              C_r(k_x, t_j) = C_r(k_x, t_j)e^{-ik_x Δx(t_j)};
7          }
8      }
9  }
```

The following pseudo-code represents applying the distance-correction operator in Equation (3) to a near-continuous wavefield obtained for a non-linear vessel track in the k-t domain:

```
1  for each (k_x, k_y) {
2      for (r = 1; r <=R; r++) {            \\ r is the trace index
3          for (j = 1; j <=M; j++) {         \\ j is the time sample index
4              read (C_r(k_x, k_y, t_m));
5              Δx(t_j) = x_j - x_0;
6              Δy(t_j) = y_j - y_0;
7              C_r(k_x, k_y, t_j) = C_r(k_x, k_y, t_j)e^{-i(k_x Δx(t_j)+k_y Δy(t_j))};
8          }
9      }
10 }
```

In alternative implementations, because the near-continuous wavefield may be large and stored as a series of component wavefields in a data-storage device, the distance-correction operators may be applied to each component near-continuous wavefield to compute distance-corrected component wavefields that are concatenated to produce a near-continuous wavefield in approximately stationary-receiver locations.

The distance corrected traces may be transformed from the t-k domain back to the s-t domain and collected to form a near-continuous wavefield in approximately stationary-receiver locations. Each trace of a near-continuous wavefield in approximately stationary-receiver locations is called a "stationary-receiver-location trace" composed of seismic data recorded for a stationary-receiver location. The term "stationary-receiver location" does not imply that a stationary receiver was used to measure the seismic data contained in a stationary-receiver-location trace. Because the sensors are moving during seismic data recording as explained above, a number of traces of the near-continuous wavefield may contain seismic data measured at about the same location. The distance-correction operators of Equations (3) and (6) apply a spatial correction to traces of the near-continuous wavefield to form stationary-receiver-location traces of a near-continuous wavefield in approximately stationary-receiver locations. Each stationary-receiver-location trace contains the seismic data measured at about the same location by one or more sensors as if a stationary receiver had instead been placed at the location. The term "stationary-receiver location" refers to the location where seismic data is measured by one or more sensors as the sensors pass over the location, and a stationary-receiver-location trace is a collection of the seismic data recorded at that location.

Figure 5:
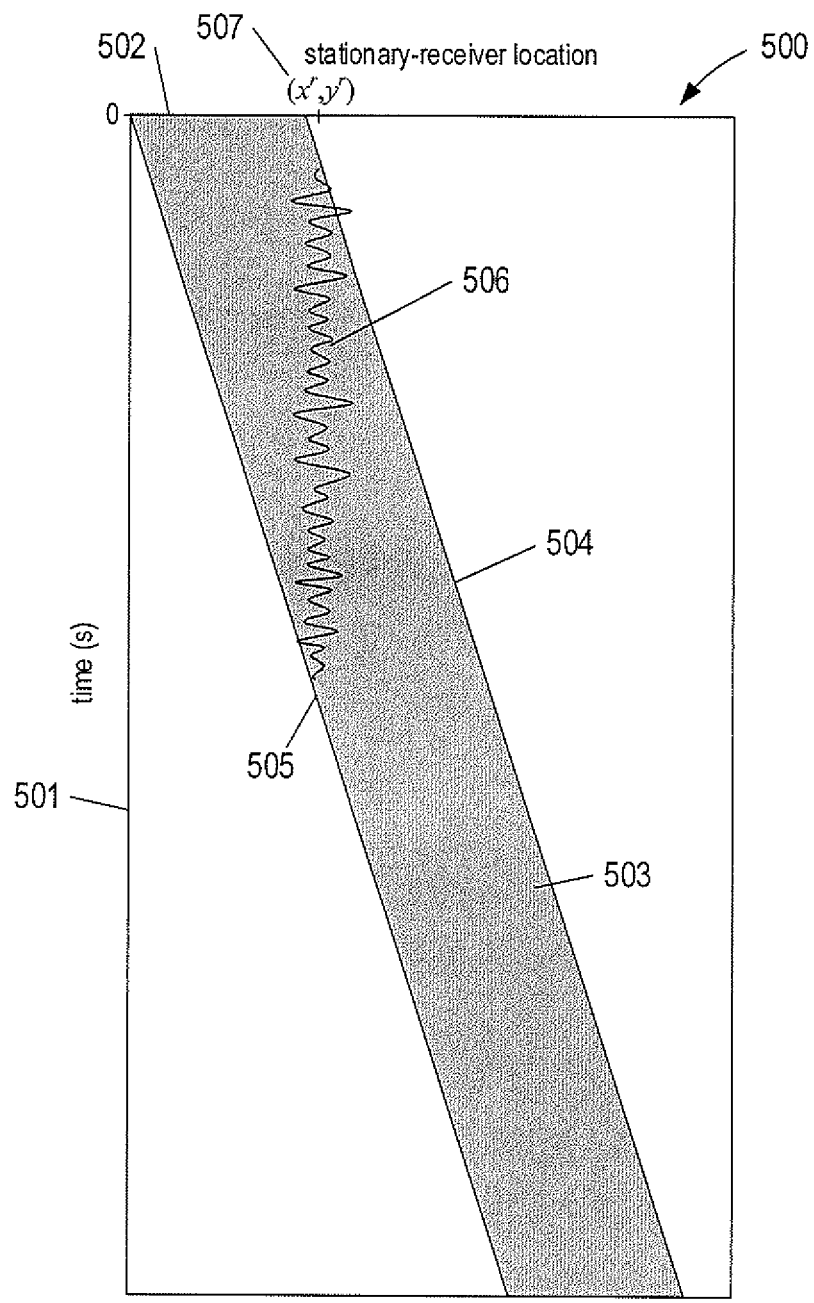
FIG. 5 shows an example near-continuous wavefield in approximately stationary-receiver locations.

FIG. 5 shows an example near-continuous wavefield in approximately stationary-receiver locations 500 obtained from applying a distance-correction operator to a near-continuous wavefield as described above with reference to Equations (2)-(7). Vertical axis 501 represents time and horizontal axis 502 represents stationary-receiver locations. The seismic data is confined to a diagonal strip represented by shaded region 503. The traces are stationary-receiver-location traces. Lines 504 and 505 represent seismic data boundaries. Unshaded portions of the stationary-receiver locations 500 do not contain seismic data. In other words, the seismic data lies within the seismic data boundaries 504 and 505. For example, a wiggle curve 506 represents a stationary-receiver-location trace $t_{crl}(x^r,y^r)$ at an approximate stationary-receiver location $(x^r,y^r)$ 507. The stationary-receiver-location trace 506 is composed of seismic data measured by one or more pressure or particle motion sensors at the stationary-receiver location $(x^r,y^r)$ and lies within the seismic data boundaries 504 and 505. In other words, the stationary-receiver-location trace 506 contains the seismic data that would have been measured by a stationary pressure or particle motion sensor placed at the approximate location $(x^r,y^r)$.

The seismic data contained in a near-continuous wavefield in approximately stationary-receiver locations contains a signal component and noise. The stationary-receiver-location trace 506 may be represented by:

$$t_{crl}(x^r,y^r)=s(x^r,y^r)+n(x^r,y^r) \qquad (8)$$

where $t_{crl}(x^r,y^r)$ is a stationary-receiver-location trace;

$s(x^r,y^r)$ is a signal component; and $n(x^r,y^r)$ is noise.

The stationary-receiver-location trace may be pressure data or particle motion data. The signal component $s(x^r,y^r)$ includes energy that may be associated with the source wavefield generated by the source. For example, the signal component may be represented as a sum of signal subcomponents:

$$s(x^r,y^r)=s_{dir}(x^r,y^r)+s_{up}(x^r,y^r)+s_{down}(x^r,y^r) \qquad (9)$$

where $s_{dir}(x^r,y^r)$ is a portion of the source wavefield that propagates directly from the source to the r-th receiver and from the source to the free surface to the r-th receiver;

$s_{up}(x^r,y^r)$ is a portion of the up-going wavefield detected at the r-th receiver; and $s_{down}(x^r,y^r)$ is a portion of the down-going wavefield (i.e., receiver ghost) detected at the r-th receiver.

Signal subcomponents $s_{up}(x^r,y^r)$ and $s_{down}(x^r,y^r)$ include any multiple reflections between the subterranean formation and the free surface detected at the r-th receiver. On the other hand, the noise $n(x^r,y^r)$ includes acoustic and non-acoustic energy not associated with the source wavefield generated by the source. For example, the noise $n(x^r,y^r)$ may be represented as a sum of noise subcomponents:

$$n(x^r,y^r)=n_{prop}(x^r,y^r)+n_{inif}(x^r,y^r)+n_{wav}(x^r,y^r)+n_{vib}(x^r,y^r)+n_{turb}(x^r,y^r)+n_{irreg}(x^r,y^r)+n_{inst}(x^r,y^r) \qquad (10)$$

where $n_{prop}(x^r, y^r)$ is noise due to propellers;

$n_{intf}(x^r, y^r)$ is seismic interference noise due to source wavefields generated by other sources used in a different marine survey;

$n_{wav}(x^r, y^r)$ is noise due to free surface waves;

$n_{vib}(x^r, y^r)$ is noise due to streamer vibrations caused by birds or any other devices attached to the streamer;

$n_{turb}(x^r, y^r)$ is noise due to turbulence in the boundary layer between the streamer surface and the surrounding water;

$n_{irreg}(x^r, y^r)$ is noise due to any irregularities on the streamer surface (e.g. barnacles and surface irregularities); and $n_{inst}(x^r, y^r)$ is noise due to instruments/electronic devices.

Although instrument/electronic noise $n_{inst}(x^r, y^r)$ is included in Equation (10), instrument/electronic noise is typically incoherent and far below the signal-component level and the levels of the other noise subcomponents. Equation (10) is not intended to be a complete representation of all the noise subcomponents that combine to produce the noise $n(x^r, y^r)$. Equation (10) merely provides a representation of a number of different acoustic and non-acoustic noise subcomponents that combine to reduce the quality of the seismic data recorded in stationary-receiver-location traces.

Figure 6:
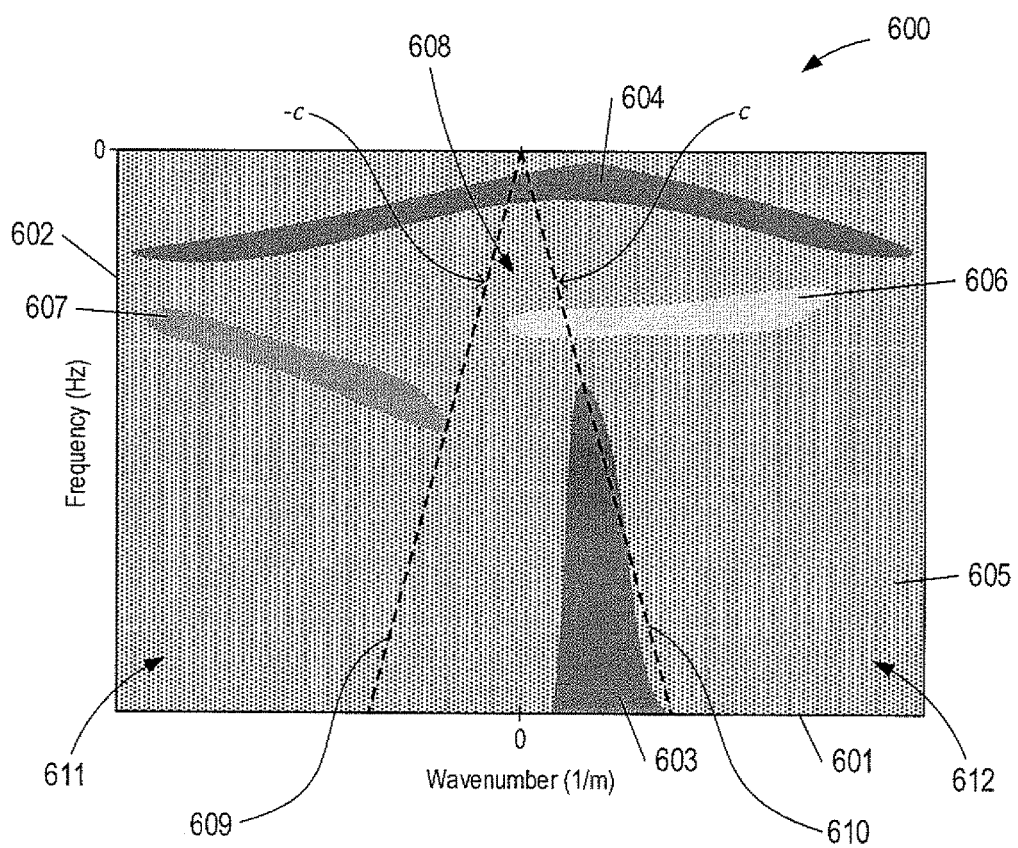
FIG. 6 shows an example spectrum of the near-continuous wavefield in approximately stationary-receiver locations shown in FIG. 5.

The near-continuous wavefield in approximately stationary-receiver locations is transformed from the s-t domain to the wavenumber-frequency ("k-f") domain. FIG. 6 shows an example spectrum 600 of the near-continuous wavefield in approximately stationary-receiver locations in the k-f domain. Horizontal axis 601 represents in-line wavenumbers k and vertical axis 602 represents angular frequencies ω. Shading represents the amplitude associated with each frequency and wavenumber computed as $A(\omega,k)=\sqrt{Re(\omega,k)^2+Im(\omega,k)^2}$, where $Re(\omega,k)$ and $Im(\omega,k)$ represent real and imaginary components, respectively, of the Fourier transform of the near-continuous wavefield in approximately stationary-receiver locations from the s-t domain to the k-f domain. The amplitude represents the amount an angular frequency ω and wavenumber k contributes to the near-continuously recorded seismic data with darker shading corresponding to larger amplitudes and lighter shading corresponding to smaller amplitudes. For example, amplitudes with frequencies and wavenumbers in dark shaded regions 603 and 604 have larger amplitudes and provide a larger power contribution to the seismic data than frequencies and wavenumbers in medium shaded region 605 and light shaded regions 606 and 607.

The angular frequency ω of a sound wave, wavenumber k of the sound wave, and speed c of the sound wave propagating in water are related by ω=kc. Because the signal component propagates along the streamer at apparent speeds greater than or equal to c, after the near-continuous wavefield in approximately stationary-receiver locations has been transformed to the k-f domain, the signal component lies within a signal region defined by frequency-to-wavenumber ratios greater than or equal to c (i.e., ω/k≥c). The signal region contains amplitudes associated with energy that propagates at speeds greater than or equal to c. In particular, the signal region will contain the signal component and any noise subcomponents that propagate at speeds greater than or equal to c.

In the example of FIG. 6, the signal component lies within a triangle-shaped signal region 608 centered about wavenumber zero. Dashed lines 609 and 610 represent boundaries of the signal region 608. Amplitudes that lie on the boundaries 609 and 610 have a frequency-to-wavenumber ratio equal to plus or minus the speed of sound in water, denoted by ±c. The sign indicates the direction energy propagates in the in-line direction, with "+c" representing energy that propagates in the positive in-line direction and "−c" representing energy that propagates in the negative in-line direction. The spectrum 600 is partitioned into the signal region 608 and two non-signal regions 611 and 612. Any energy that propagates at a speed greater than or equal to c has an amplitude within the signal region 608, and any energy that propagates at a speed less than c has amplitudes in one of the non-signal regions 611 and 612. Because certain noise subcomponents also propagate along the streamer with apparent speeds greater than or equal to c, the signal region 608 contains the signal component and certain noise subcomponents.

Ideally, the non-signal regions 611 and 612 contain noise that propagate at speeds less than c, which is also called "low-speed noise." However, low-speed noise is not strictly confined to the non-signal regions 611 and 612 and, under certain conditions, may leak into the signal region 608. Although there are a number reason for why low-speed noise leaking occurs, the two primary reasons are thought to be as follows. First, spatial sampling of sensors is typically not sufficient to prevent spatial aliasing. As a result, low-speed noise may wrap around the wavenumber-frequency spectrum a number of times, and significant portions of the low-speed noise may end up in the signal region 608. Second, perturbations in sensor responses to noise and variations along the streamer section (e.g. barnacle and streamer surface irregularities) may randomize the low-speed noise, which may result in a portion of the low-speed noise ending up into the signal region 608.

Methods described herein are not intended to attenuate noise by effectively removing noise subcomponents that propagate at speeds greater than or equal to c, but instead to attenuate noise by effectively removing noise that propagates at speeds less than c which is called "low-speed noise." For example, propeller noise $n_{prop}(x^r,y^r)$ and seismic interference noise $n_{intf}(x^r,y^r)$ propagate through water at speed c and lies almost entirely in the signal region 608. By contrast, streamer vibration noise $n_{vib}(x^r,y_r)$, turbulence noise $n_{turb}(x^r,y^r)$, and streamer irregularities noise $n_{irreg}(x^r,y^r)$ propagate at speeds less than c and are examples of low-speed noise with corresponding amplitudes located in the non-signal regions 611 and 612. Low-speed noise amplitudes may also leak into the signal region 608 due to spatial aliasing and streamer irregularities.

Figure 7:
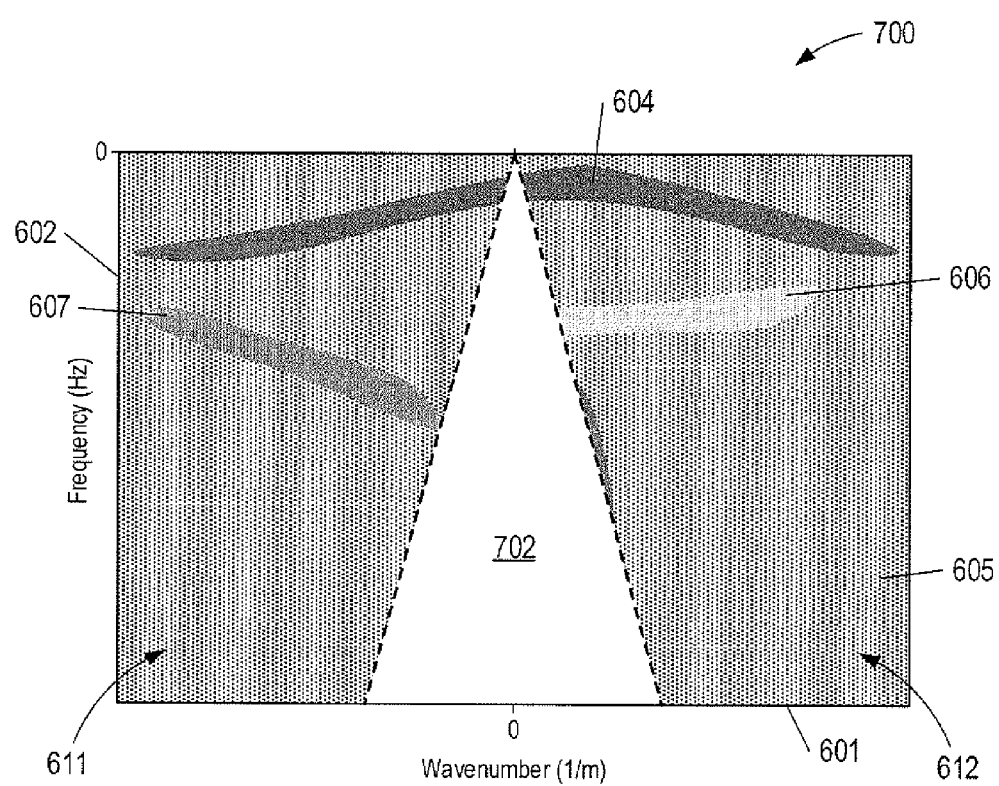
FIG. 7 shows an example partial noise spectrum.

After the signal region 608 has been determined, amplitudes in the signal region 608 may be muted (i.e., zeroed), leaving a partial noise spectrum composed of the non-signal regions 611 and 612. FIG. 7 shows a plot of a partial noise spectrum 700 of the spectrum 600 shown in FIG. 6. Unshaded triangle 702 represents a muted signal region obtained by muting the amplitudes of the signal region 608. Amplitudes of noise subcomponents that lie in the non-signal regions 611 and 612 are not changed. Note that muting amplitudes in the signal region 608 to obtain the muted signal region 702 not only mutes the signal component but also mutes any noise subcomponents that propagate at speeds greater than or equal to c and any portion of the low-speed noise that may have leaked into the signal region 608. As a result, after muting, the partial noise spectrum 700 contains only the amplitudes of the low-speed noise in non-signal regions 611 and 612. For example, propeller noise $n_{prop}(x^r,y^r)$ and seismic interference noise $n_{intf}(x^r,y^r)$ would be muted in muted signal region 702 while amplitudes of the streamer vibration noise $n_{vib}(x^r,y^r)$, turbulence noise $n_{turb}(x^r,y^r)$, and streamer irregularities noise $n_{irreg}(x^r, y^r)$, which lie primarily in the non-signal regions 611 and 612, would not be changed, except for any portions of the low-speed noise that leaked into the signal region 608.

A model of the low-speed noise may be obtained, for example, by iterative computation. The low-speed noise model does not contain the signal component and noise subcomponents that propagate at speeds greater than or equal to c. The low-speed noise model is composed of the low-speed noise and interpolated low-speed noise that approximates portions of the low-speed noise that leaked into the signal region 608 due to aliasing and/or irregularities. As a result, noise in the near-continuous wavefield in approximately stationary-receiver locations may be attenuated by subtracting the low-speed noise model without adversely affecting the signal component of the near-continuous wavefield in approximately stationary-receiver locations.

Figure 8:
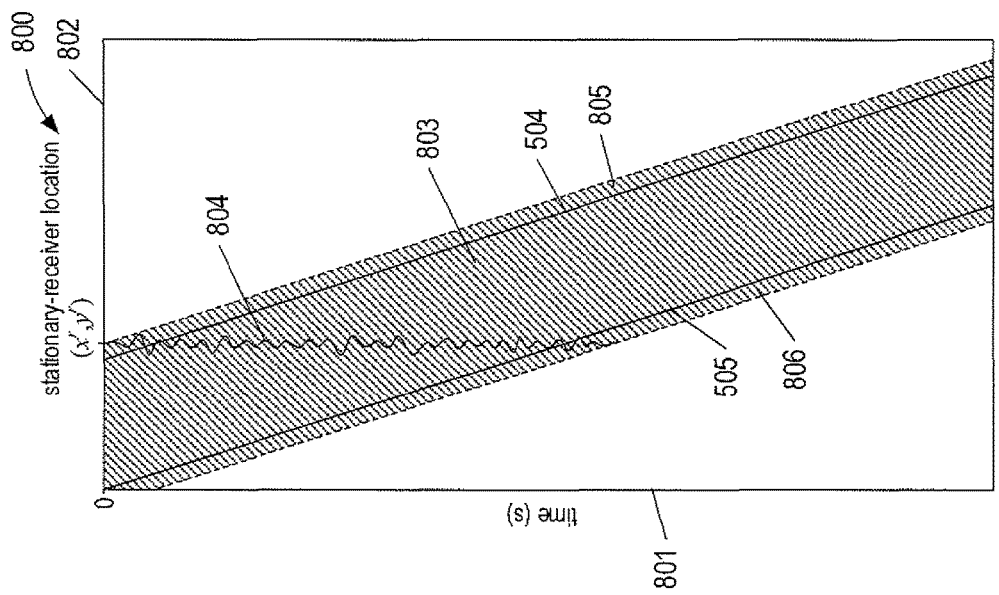
FIG. 8 shows an example unbounded noise model.

A method to iteratively compute a model of the low-speed noise is now described with reference to FIGS. 8-13. The partial noise spectrum 700 may be inverse transformed from the k-f domain back to the s-t domain. The inverse transformation may be performed, for example, with an inverse FFT ("IFFT") or an inverse DFT ("IDFT"). FIG. 8 shows an example unbounded low-speed noise model 800 computed by inverse transforming the partial noise spectrum 700. Vertical axis 801 represents time and horizontal axis 802 represents stationary-receiver locations. Shaded region 803 represents the low-speed noise in the s-t domain obtained by transforming the partial noise spectrum 700 from the k-f domain to the s-t domain and does not include the low-speed noise muted in muted signal region 702. For example, a partial noise trace 804 contains low-speed noise subcomponents of the stationary-receiver-location trace 506, shown in FIG. 5, but does include low-speed noise that may have leaked into the signal region 608 of FIG. 6. As shown in FIG. 8, because only a portion of the low-speed noise contained in partial noise spectrum 700 is transformed back to the s-t domain, the energy of the low-speed noise spreads beyond the seismic data boundaries 504 and 505 in the s-t domain. Amplitudes of the low-speed noise that spreads beyond the seismic data boundaries 504 and 505 are represented by spreading regions 805 and 806.

Figure 9:
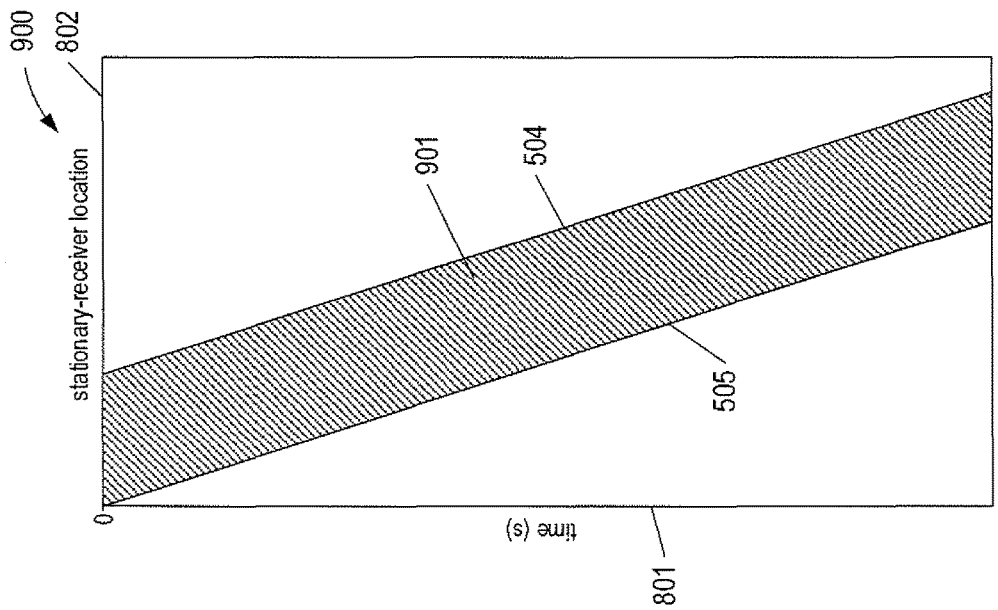
FIG. 9 shows an example noise model obtained from muting amplitudes of the unbound noise model.

Amplitudes located outside the seismic data boundaries 504 and 505 are muted. FIG. 9 shows an example low-speed noise model 900 that results from muting amplitudes of the low-speed noise that spread beyond the seismic data boundaries 504 and 505. Shaded region 901 represents low-speed noise that lies within the seismic data boundaries 504 and 505.

Figure 10:
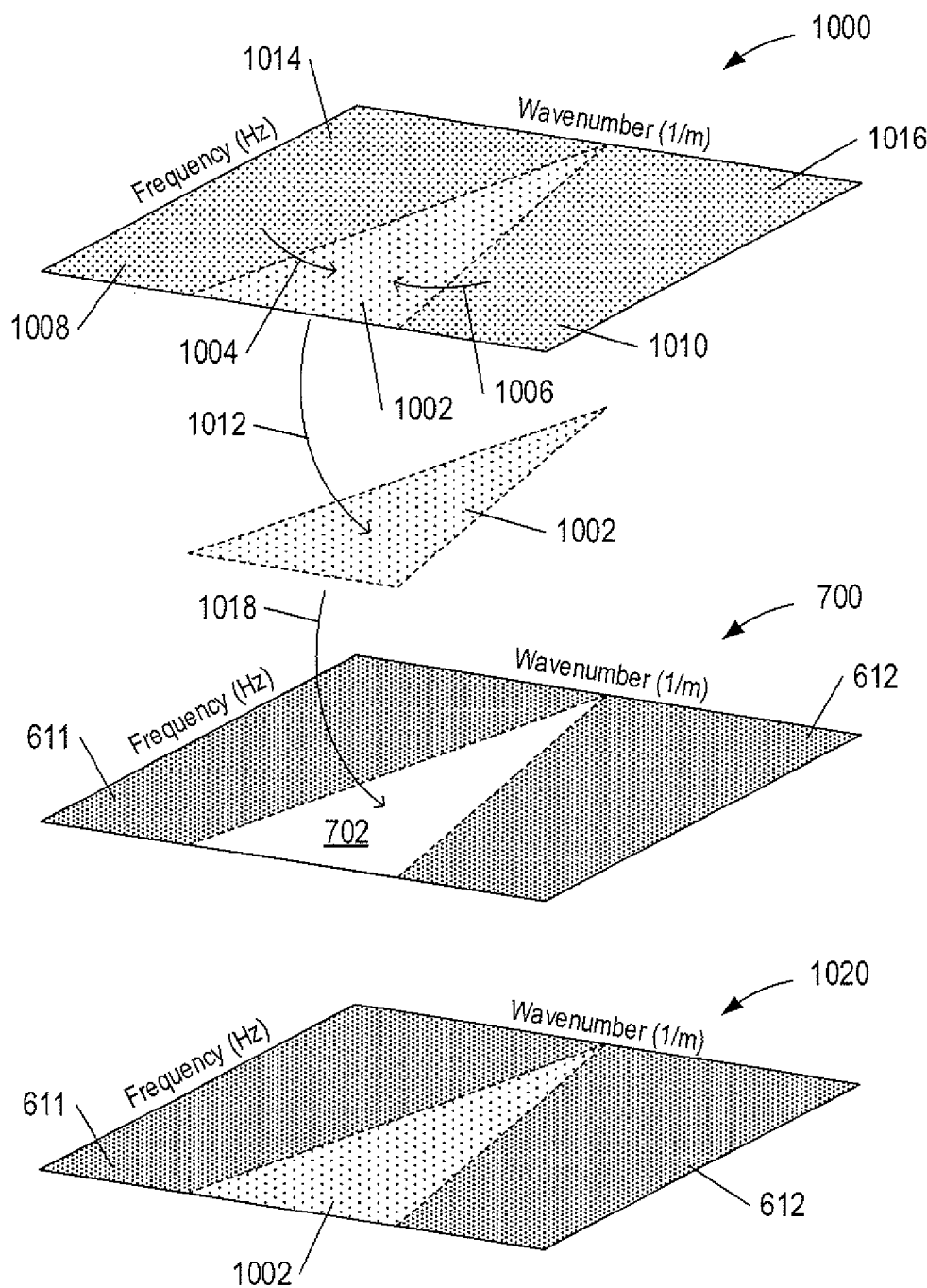
FIG. 10 shows an example noise model spectrum.
Figure 11:
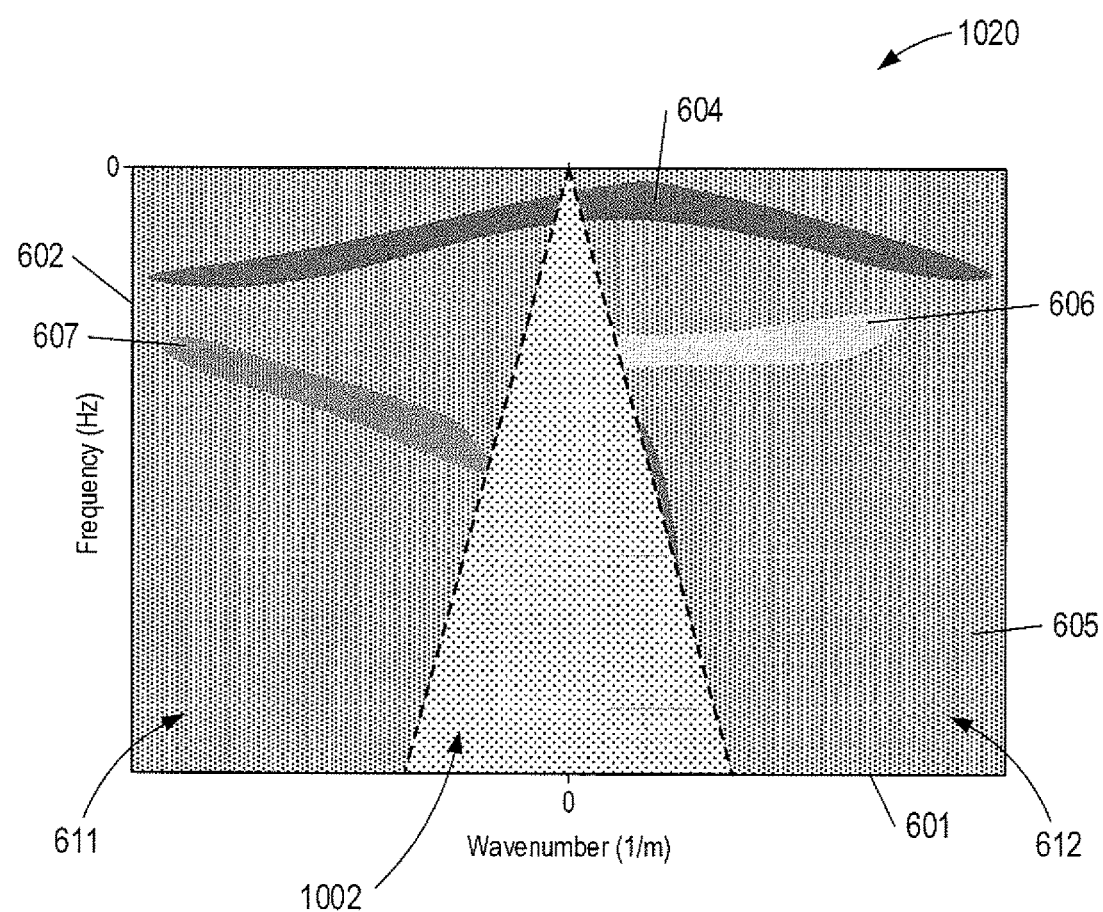
FIG. 11 shows a corrected noise model spectrum with an interpolated signal region.

Low-speed noise that leaks into the signal region 608 of FIG. 6 may be interpolated from the low-speed noise that lies in non-signal regions 611 and 612 by transforming the low-speed noise model 900 from the s-t domain to the k-f domain, for example using an FFT or a DFT. FIG. 10 shows an example low-speed noise model spectrum 1000 in the k-f domain. By transforming the low-speed noise model 900 to the k-f domain, energy of low-speed noise that lies in non-signal region 611 and 612 of FIG. 6 leaks into previously muted signal region 702 to form an interpolated low-speed noise region 1002. Directional arrows 1004 and 1006 represent energy that leaks into the interpolated low-speed noise region 1002 from the non-signal regions 1008 and 1010. The interpolated low-speed noise region 1002 approximates amplitudes of the low-speed noise present in the actual signal region 608 of the spectrum 600. Because a portion of the energy of the non-signal regions 1008 and 1010 has leaked into the interpolated low-speed noise region 1002, the energy of the non-signal regions 1008 and 1010 is depleted. The interpolated low-speed noise region 1002 is combined with the original non-signal regions 611 and 612 of the spectrum 600 in order to recover the depleted energy. In the example of FIG. 10, directional arrows 1012 and 1018 represent replacing the muted signal region 702 by the interpolated signal region 1002 to obtain a corrected low-speed noise model spectrum 1020. FIG. 11 shows the corrected low-speed noise model spectrum 1020 composed of the interpolated low-speed noise region 1002 and the non-signal regions 611 and 612 of the spectrum 600.

Figure 12:
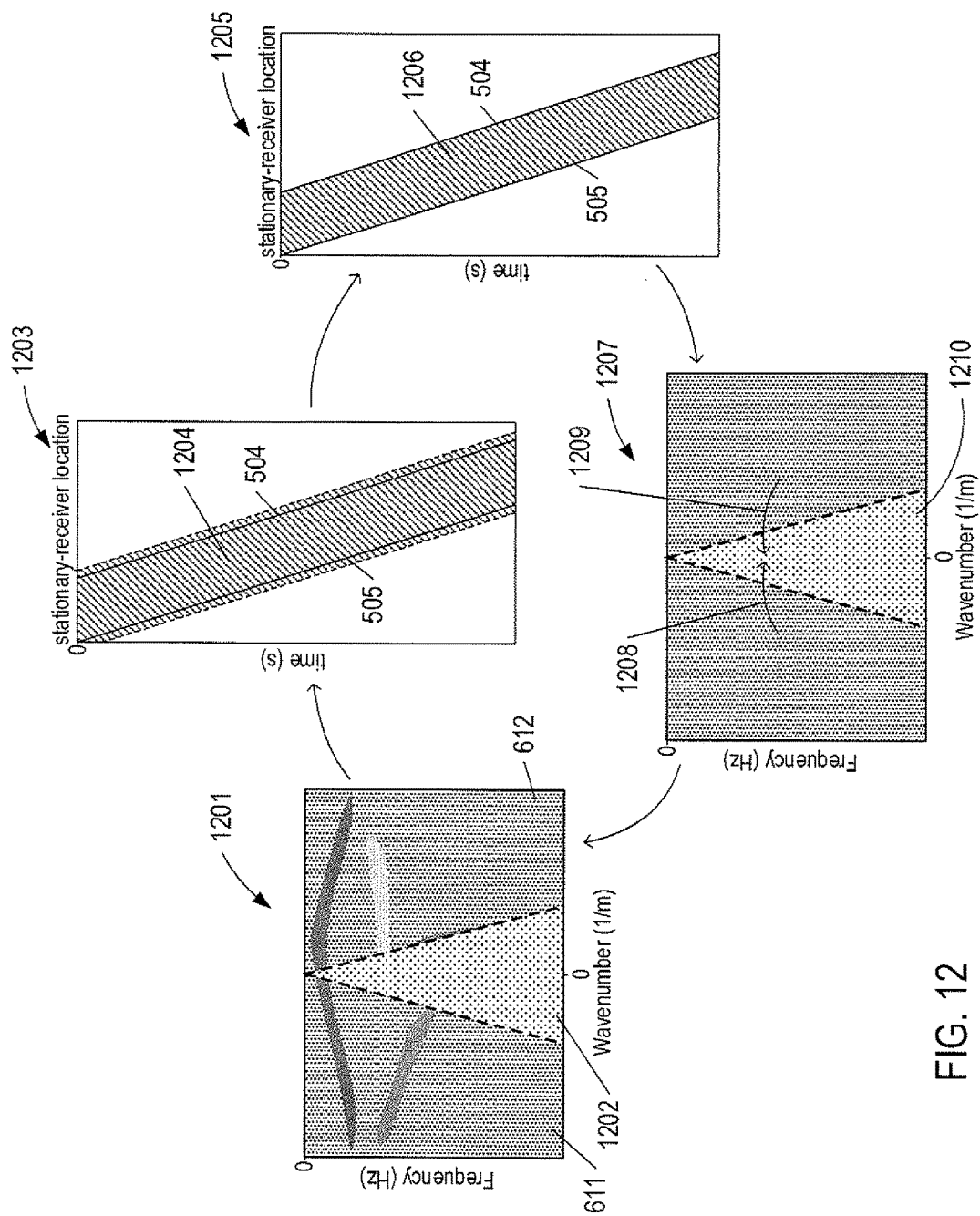
FIG. 12 shows an iterative process of generating an approximate noise of the noise contained in the near-continuous wavefield in stationary-receiver locations shown in FIG. 5.

FIG. 12 shows an example of an iterative loop that generates a model of the low-speed noise contained in the near-continuous wavefield in stationary-receiver locations 500 shown in FIG. 5. The iterative approach begins with a corrected low-speed noise model spectrum 1201. The corrected low-speed noise model spectrum 1201 is a combination of an interpolated low-speed noise region 1202 and non-signal regions 611 and 612 of the spectrum 600. The interpolated low-speed noise region 1202 may be obtained as described above with reference to FIG. 10. The corrected low-speed noise model spectrum 1201 is then transformed from the k-f domain to the s-t domain to obtain an unbounded low-speed noise model 1203. Shaded region 1204 represents unbounded low-speed noise that spreads beyond seismic data boundaries 504 and 505 of the near-continuous wavefield in approximately stationary-receiver locations 500, shown in FIG. 5. The unbounded low-speed noise 1204 includes low-speed noise and interpolated low-speed noise. Amplitudes of the unbounded low-speed noise 1204 located outside the seismic data boundaries 504 and 505 are muted to obtain low-speed noise model 1205. Shaded region 1206 represents approximate low-speed noise of the near-continuous wavefield in approximately stationary-receiver locations 500. The low-speed noise model 1205 may then be transformed from the s-t domain to the k-f domain to obtain a low-speed noise model spectrum 1207. Directional arrows 1208 and 1209 represent energy of the low-speed noise that leaks into previous interpolated low-speed noise region 1202 to obtain a corrected interpolated low-speed noise region 1210. The corrected interpolated low-speed noise region 1210 replaces the previous interpolated low-speed noise region 1202 and the processes is repeated, each time building up the interpolated low-speed noise region 1210 and decreasing the amount of energy that leaks beyond the seismic data boundaries 504 and 505. The end result of repeating the iterative loop of FIG. 12 is a low-speed noise model 1205.

In one implementation, the iterative process represented in FIG. 12 may be repeated for a pre-selected, fixed number of iterations denoted by N. In an alternative implementation, the iterative process represented in FIG. 12 may be repeated until the amount of energy that spreads beyond the seismic data boundaries 504 and 505 is essentially unchanged. For example, the iterative process represented in FIG. 12 may be repeated until $$|E_c - E_p| < T \tag{11}$$

where
T is a non-zero threshold value (e.g., T=0.01);
$E_p$ is the energy that spreads beyond the seismic data boundaries for the previous iteration; and
$E_c$ is the energy that spreads beyond the seismic data boundaries for the current iteration.

In general, the energy outside the seismic data boundaries 504 and 505 at iteration q may be calculated according to $$E_q = \sum_i |a(x_i^r, y_i^r, t_i)|^2 \qquad (12)$$

where
$a(x_i^r, y_i^r, t_i)$ is the amplitude of low-speed noise that has leaked beyond (i.e., outside) the seismic data boundaries 504 and 505; and
the summation is over points $(x_i^r, y_i^r, t_i)$ located outside the seismic data boundaries 504 and 505.

The low-speed noise model 1205 produced after N iterations or when the condition of Equation (11) is satisfied is subtracted from the near-continuous wavefield in approximately stationary-receiver locations 500 to obtain a noise-attenuated near-continuous wavefield in approximately stationary-receiver locations.

Figure 13:
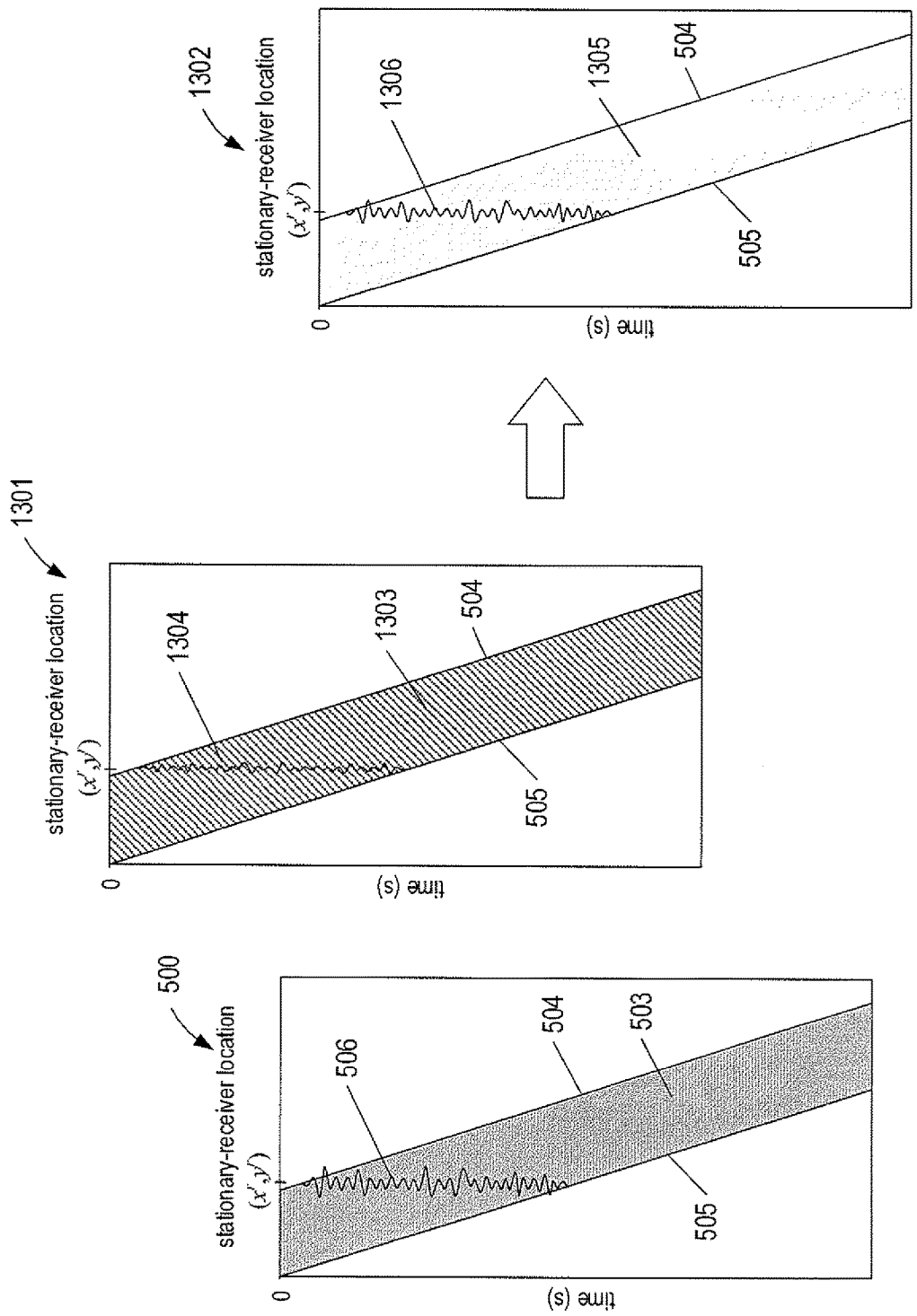
FIG. 13 shows an example of a noise model subtracted from the near-continuous wavefield in approximately stationary-receiver locations shown in FIG. 5 to obtain a noise-attenuated near-continuous wavefield in approximately stationary-receiver locations.

FIG. 13 shows an example of a low-speed noise model 1301 subtracted from the near-continuous wavefield in approximately stationary-receiver locations 500 to obtain a noise-attenuated near-continuous wavefield in approximately stationary-receiver locations 1302. The low-speed noise model 1301 may be generated after N iterations represented in FIG. 12 or when the condition of Equation (11) is satisfied after a number of iteration loops represented in FIG. 12. The low-speed noise model 1301 includes approximate low-speed noise 1303 that lies within the seismic data boundaries 504 and 505. The approximate low-speed noise 1303 is composed of low-speed noise and interpolated low-speed noise that approximates the low-speed noise subcomponents that leaked into signal region 608 of FIG. 6 and were muted in muted signal region 702 of FIG. 7. A trace 1304 of the approximate low-speed noise 1303 may be represented by:

$$\hat{n}(x^r, y^r) = n_{int}(x^r, y^r) + n_{<c}(x^r, y^r) \qquad (13)$$

where
$n_{<c}(x^r, y^r)$ is the low-speed noise subcomponents; and
$n_{int}(x^r, y^r)$ is the interpolated low-speed noise.

The noise $n_{<c}(x^r, y^r)$ represents the noise subcomponents that lie within the non-signal regions 611 and 612 of the spectrum 600. The interpolated low-speed noise $n_{int}(x^r, y^r)$ is obtained after repeating the iterative loop shown in FIG. 12 and approximates the low-speed noise that leaks in the signal region 608 due to spatial aliasing and/or streamer irregularities. The noise-attenuated near-continuous wavefield in approximately stationary-receiver locations 1302 includes seismic data represented by shaded region 1305. The seismic data 1305 includes the signal component of the seismic data 503 with the noise reduced by the approximate low-speed noise 1303. A noise-attenuated stationary-receiver-location trace 1306 may be presented by:

$$t_{crl}(x^r, y^r) = s(x^r, y^r) + n(x^r, y^r) - \hat{n}(x^r, y^r) \qquad (14)$$

The noise-attenuated stationary-receiver-location trace 1306 includes the signal component $s(x^r, y^r)$ of the stationary-receiver-location trace 506, as represented by Equation (8), and attenuated noise represented by $n(x^r, y^r) - \hat{n}(x^r, y^r)$.

In the above description, the transformation domain is the wavenumber-frequency domain, and a two-dimensional Fourier transform, such as a FFT or a DFT, may be used to transform the near-continuous wavefield in approximately stationary-receiver locations from the s-t domain to the k-f domain. However, noise attenuation methods described above are not intended to be limited to use of the k-f domain as the transformation domain, or to use of Fourier transforms. In practice, other transforms may be used to transform the near-continuous wavefield in approximately stationary-receiver locations from the s-t domain to a suitable transformed domain. For example, a curvelet transform may be used to transform the near-continuous wavefield in approximately stationary-receiver locations from the s-t domain to a curvelet domain, and a linear, parabolic or hyperbolic Radon transform may be used to transform the near-continuous wavefield in approximately stationary-receiver locations from the s-t domain to a polar-coordinate domain. For a Radon transform, the signal region is defined by a slowness p or inverse of the speed c.

Methods described above are not intended to be limited to attenuating noise in near-continuously recorded seismic data. Methods described above may also be used to attenuate noise in seismic data recorded in shot records. The seismic data in a shot record may be in any domain. For example, the seismic data may be in common-shot domain, common-receiver domain, common-receiver-station domain, or a common-midpoint domain. In order to apply the methods described to seismic data in a shot record, the seismic data is first padded with zeros.

Figure 14:
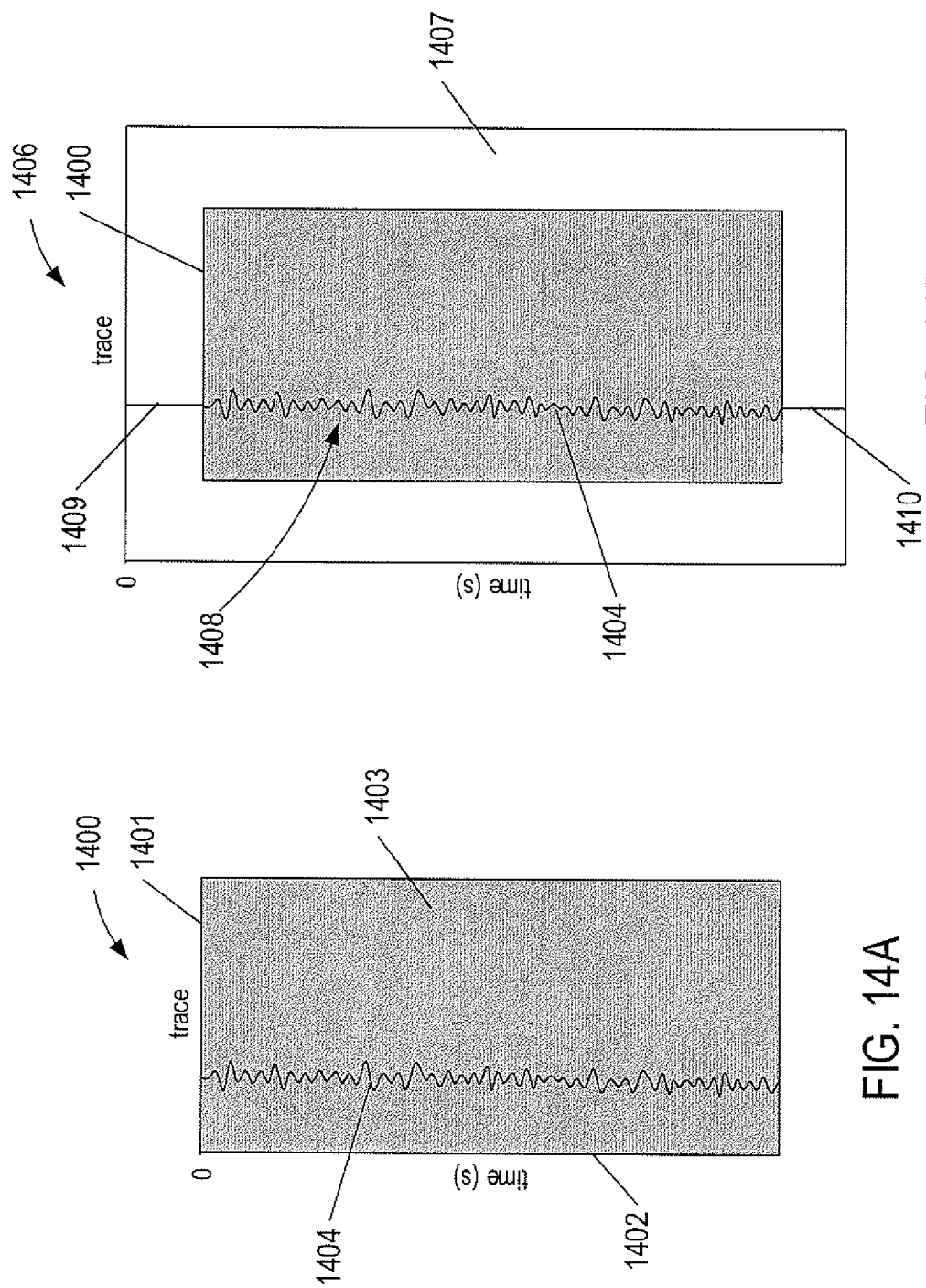
FIGS. 14A-14B show an example of padding a shot record with zeros amplitude time samples.

FIGS. 14A-14B show an example of padding a shot record with zeros. FIG. 14A shows a shot record as a gather 1400 composed of a number of traces. Horizontal axis 1401 represents trace number or channel, and vertical axis 1402 represents time. Shaded region 1403 represents seismic data recorded as traces, each trace generated by a pressure sensor or a particle motion sensor. For example, wiggle curve 1404 represents a trace of seismic data. Like with the near-continuous wavefield in approximately stationary-receiver locations, the seismic data in common-shot gather 1400 contains a signal component and noise. For example, the trace 1404 includes a signal component and noise as represented by Equation (8). Padding may be accomplished by prepending a string of zero-amplitude time samples to the beginning of each trace and appending a string of zero-amplitude time samples to the end of each trace. For example, a trace represented by $tr(r) = \{c^r(t_j)\}_{j=1}^J$ is padded by prepending and appending zero-amplitude time samples at the beginning and end of the trace to obtain a padded trace represented by $tr_{pad}(r) = \{0, \ldots, 0, c^r(t_j), 0, \ldots, 0\}_{j=1}^J$. The padded trace $tr_{pad}(r)$ contains the same seismic data as the original trace $tr(r)$ with zeros located at the beginning and end of the trace. Padding may include prepending zero-amplitude traces before the first trace and appending zero-amplitude traces after the last trace.

FIG. 14B shows a padded common-shot gather 1406 generated by padding each of the traces in common-shot gather 1400. Padded common-shot gather 1406 includes the same common-shot gather 1400 surrounded by zero-amplitude time samples represented by unshaded region 1407. For example, trace 1408 includes trace 1404 and zero-amplitude time samples represented by flat amplitude regions 1409 and 1410.

Figure 15:
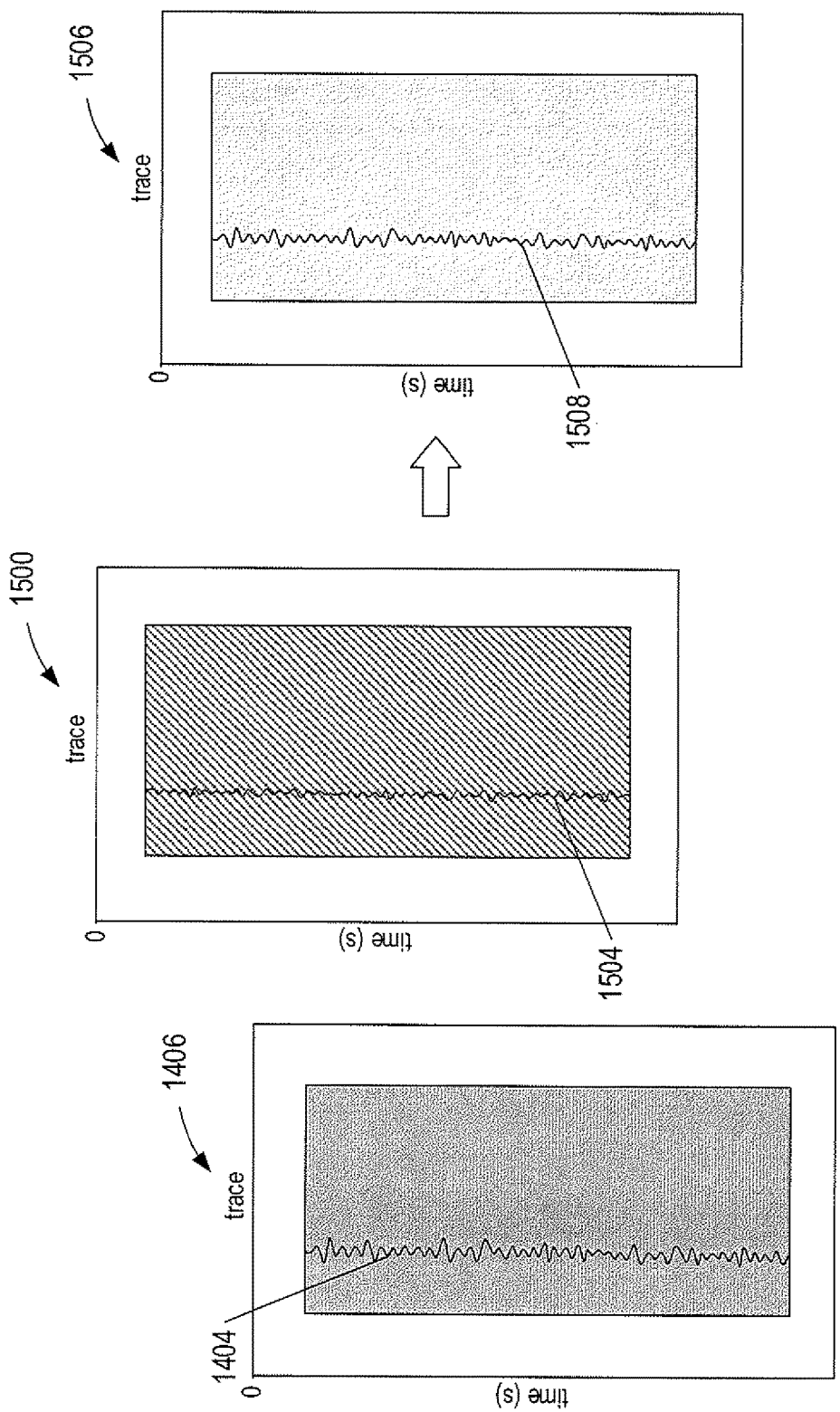
FIG. 15 shows an example of a low-speed noise model subtracted from a padded common-shot gather to obtain a noise-attenuated padded common-shot gather.

Methods described above with reference FIGS. 6-12 are applied to the padded common-shot gather 1406 for a preselected number of iterations N or until Equation (11) is satisfied to a generate a padded low-speed noise model. FIG. 15 shows an example of a padded low-speed noise model 1500 subtracted from the padded common-shot gather 1406 to obtain a noise-attenuated padded common-shot gather 1506. The low-speed noise model 1500 may be generated after N iteration loops represented in FIG. 12 or when the condition of Equation (11) is satisfied after a number of iteration loops represented in FIG. 12. A trace 1504 of the low-speed noise model 1500 may be represented by Equation (13). The low-speed noise model 1500 is subtracted from the padded common-shot gather 1406 to obtain noise-attenuated padded common-shot gather 1506. Trace 1508 of the noise-attenuated padded common-shot gather 1506 includes the signal component of the seismic data of common-shot gather 1400 with the noise reduced by the low-speed noise model 1500 as represented by Equation (14). Zero padding of the noise-attenuated padded common-shot gather 1506 may be removed to obtain a noise-attenuated common-shot gather.

Figure 16:
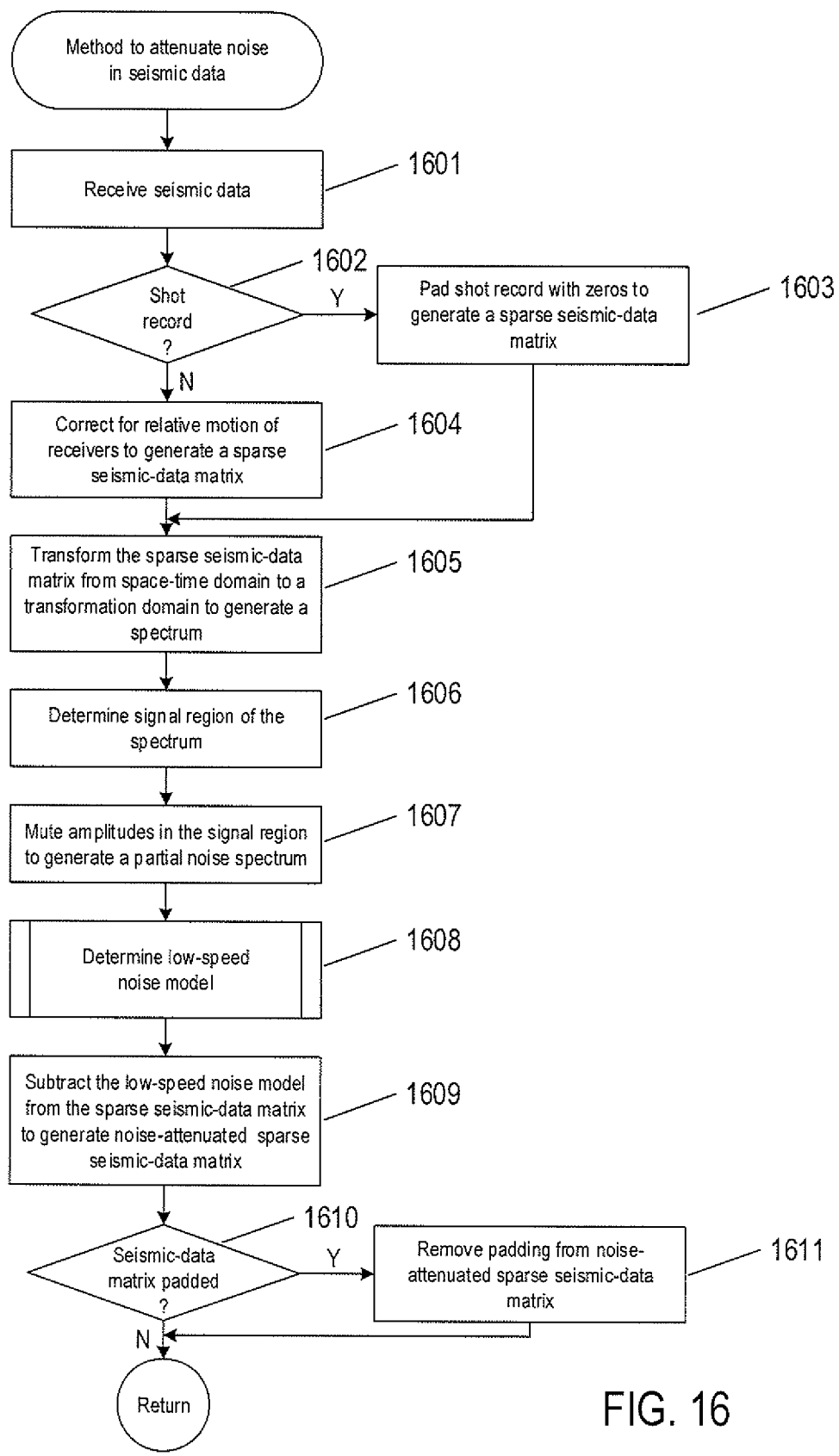
FIG. 16 shows a control-flow diagram of a method to attenuate noise in near-continuously recorded seismic data.

FIG. 16 shows a control-flow diagram of a method to attenuate noise in seismic data. In block 1601, seismic data is received, as described above with reference to FIGS. 1-4. The seismic data may be near-continuously recorded pressure data or near-continuously recorded particle motion data. Alternatively, the seismic data may be pressure data or particle motion data recorded in a shot record of a limited time length (e.g. about 8-12 seconds) and sorted in any suitable domain, such a common-shot gather, common-midpoint gather, or a common-receiver gather. In decision block 1602, the seismic data is identified as either a shot record or near-continuously recorded seismic data. When the seismic data is identified as a shot record, control flows to block 1603. Otherwise, the seismic data is near-continuously recorded seismic data, and control flows to block 1604. In block 1603, the seismic data recorded in a shot record is padded with zeros, as described above with reference to FIGS. 14A-14B. In block 1604, the near-continuously recorded seismic data is corrected for relative motion of the receivers to generate a near-continuous wavefield in approximately stationary-receiver locations, as described above with reference to Equations (2)-(7). The padded shot record created in block 1603 and the near-continuous wavefield in approximately stationary-receiver locations created in block 1604 both contain a number of zero-amplitude time samples and are both called "sparse seismic-data matrices." The computational operations represented by blocks 1605-1609 may be performed on either the padded shot record or the near-continuous wavefield in approximately stationary-receiver locations. In the following description of blocks 1605-1609, the term "sparse seismic-data matrix" is used to refer to either the padded shot record created or the near-continuous wavefield in approximately stationary-receiver locations. In block 1605, the sparse seismic-data matrix is transformed from the s-t domain to a transformation domain using a suitable transform to generate a spectrum of the sparse seismic-data matrix. For example, the transform may be an FFT or a DFT and the transformation domain may be the k-f domain. Alternatively, the transform may be a curvelet transform and the transformation domain may be the curvelet domain or the transform may be Radon transform and the transformation domain maybe the polar-coordinate domain. In block 1606, a signal region of the transformation domain is determined. For example, in the k-f domain the signal region may be determined as described above with reference to FIG. 6. In block 1607, amplitudes in the signal region are muted by setting amplitudes that lie within the signal region and signal region located on the signal-region boundary equal to zero to generate a partial noise spectrum, as described above with reference to FIG. 7. In block 1608, a routine "determine low-speed noise model" is called to iteratively determine a low-speed noise muted in the muted signal region and generate a model of the low-speed noise contained in the sparse seismic-data matrix. The low-speed noise model generated in block 1609 is subtracted from sparse seismic-data matrix to obtain a noise-attenuated sparse seismic-data matrix, as described above with reference to FIGS. 13 and 15. In decision block 1610, if the noise-attenuated sparse seismic-data matrix is a noise-attenuated padded shot record, control flow to block 1611 and the zero padding is removed to obtain noise-attenuated shot record of seismic data.

Figure 17A:
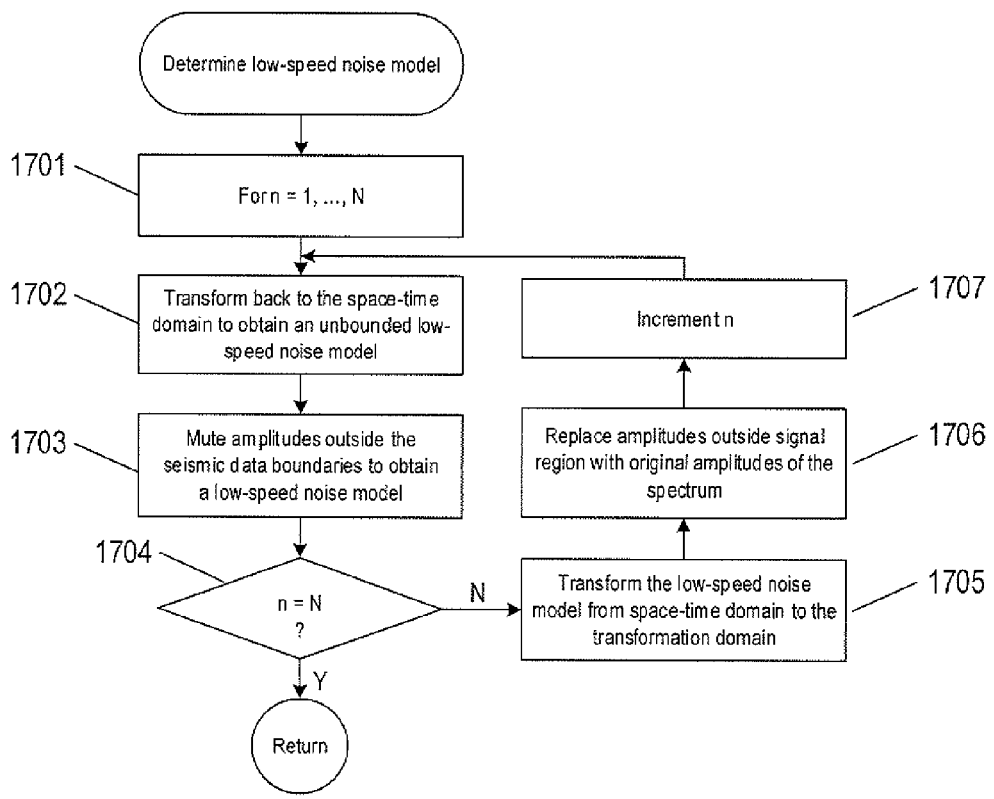
FIG. 17A shows a control-flow diagram of the routine "determine low-speed noise model" called in FIG. 16.

FIG. 17A shows a control-flow diagram of the routine "determine low-speed noise model" called in block 1608 of FIG. 16. A for-loop beginning with block 1701 repeats the operations of blocks 1702-1707 for N iterations. In block 1702, the partial noise spectrum generated in block 1607 of FIG. 16 is transformed from the transformation domain back to the s-t domain using an inverse transform. For example, if the partial noise spectrum is in the k-f domain, the partial noise spectrum is transformed to the s-t domain using an IFFT or an IDFT as described with reference to FIG. 8. In block 1703, amplitudes of seismic data located outside the seismic data boundaries of the seismic data of the near-continuous wavefield in approximately stationary-receiver locations are muted to generate a noise model that approximates the noise of the near-continuous wavefield in approximately stationary-receiver locations, as described above with reference to FIG. 9. In decision block 1704, when iteration index n equals N, the noise model computed in block 1703 is returned. Otherwise, in block 1705, the noise model generated in block 1703 is transformed from the s-t domain to the transformation domain to generate a noise model spectrum, as described above with reference to FIG. 10. The transformation back to the transformation domain causes energy in the non-signal regions to leak into the previously muted signal region from non-signal regions to generate an interpolated signal region in the noise model spectrum, as described above with reference to FIG. 10. In block 1706, a corrected noise model spectrum is generated by combining the interpolated signal region with the non-signal regions of the spectrum generated in block 1605, as described above with reference to FIGS. 10 and 11. In block 1707, the iteration index n is incremented.

Figure 17B:
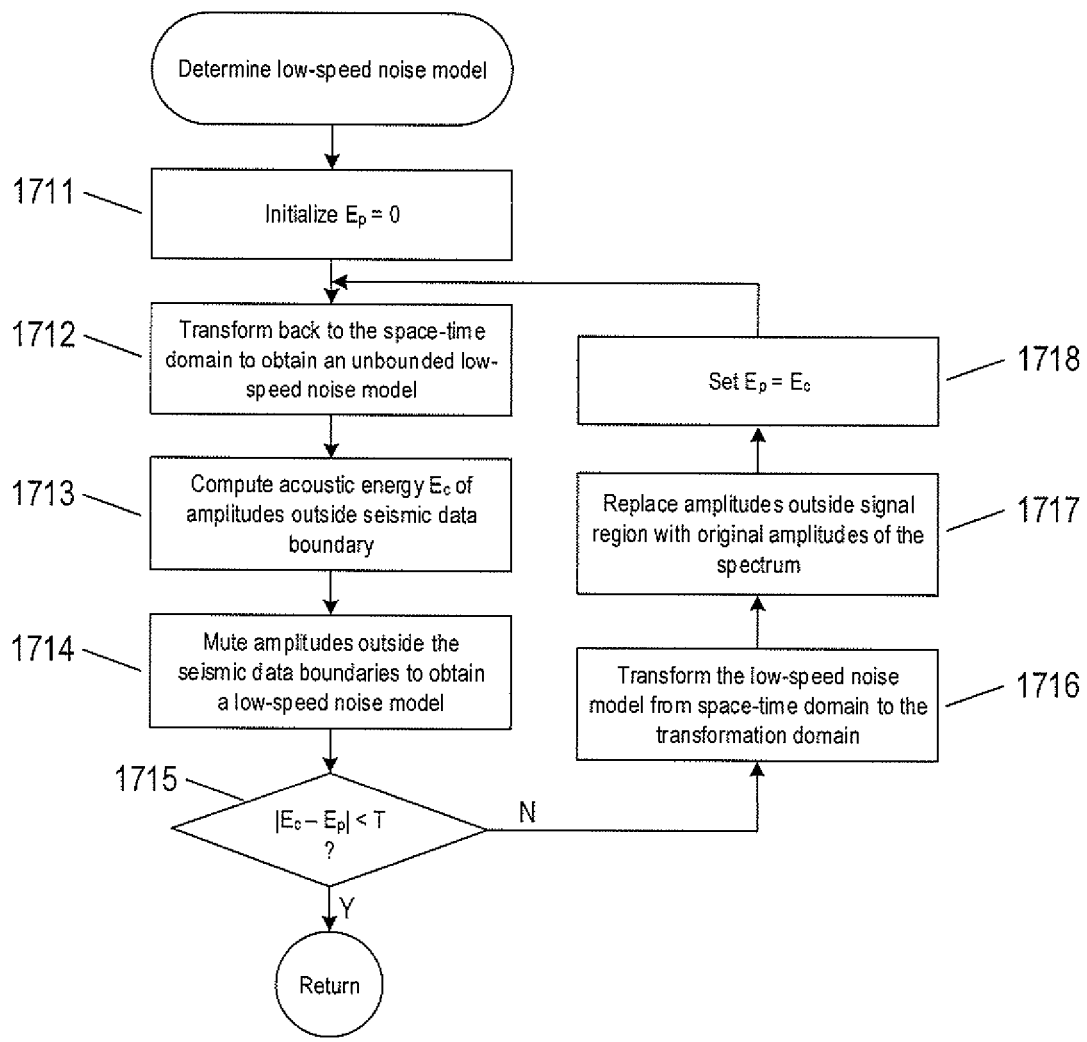
FIG. 17B shows a control-flow diagram of the routine "determine low-speed noise model" called in FIG. 16.

FIG. 17B shows a control-flow diagram of the routine "determine low-speed noise model" called in block 1608 of FIG. 16. In block 1711, a previous iteration energy $E_p$ is initialized to zero. In block 1712, the partial noise spectrum generated in block 1607 is transformed from the transformation domain back to the s-t domain using an inverse transform. For example, if the partial noise spectrum is in the k-f domain, the partial noise spectrum is transformed to the s-t domain using an IFFT or an IDFT as described with reference to FIG. 8. In block 1713, the energy $E_c$ is computed according to Equation (12). In block 1714, amplitudes of seismic data located outside the seismic data boundaries of the seismic data of the near-continuous wavefield in approximately stationary-receiver locations are muted to generate a noise model that approximates the noise of the near-continuous wavefield in approximately stationary-receiver locations, as described above with reference to FIG. 9. In decision block 1715, when the absolute difference between the previous iteration energy $E_p$ and the current iteration energy $E_c$ is less than a threshold T as described above with reference to Equation (11), the noise model computed in block 1714 is returned. Otherwise, in block 1716, the noise model generated in block 1714 is transformed from the s-t domain to the transformation domain to generate a noise model spectrum, as described above with reference to FIG. 10. The transformation back to the transformation domain causes energy in the non-signal regions to leak into the previously muted signal region from non-signal regions to generate an interpolated signal region in the noise model spectrum, as described above with reference to FIG. 10. In block 1717, a corrected noise model spectrum is generated by combining the interpolated signal region with the non-signal regions of the spectrum generated in block 1703, as described above with reference to FIGS. 10 and 11. In block 1718, the previous iteration energy $E_p$ is assigned the value of the current iteration energy $E_c$. The operations represented by blocks 1712-1718 are repeated until the condition represented by Equation (11) is satisfied, as described above with reference to FIG. 12.

Figure 18:
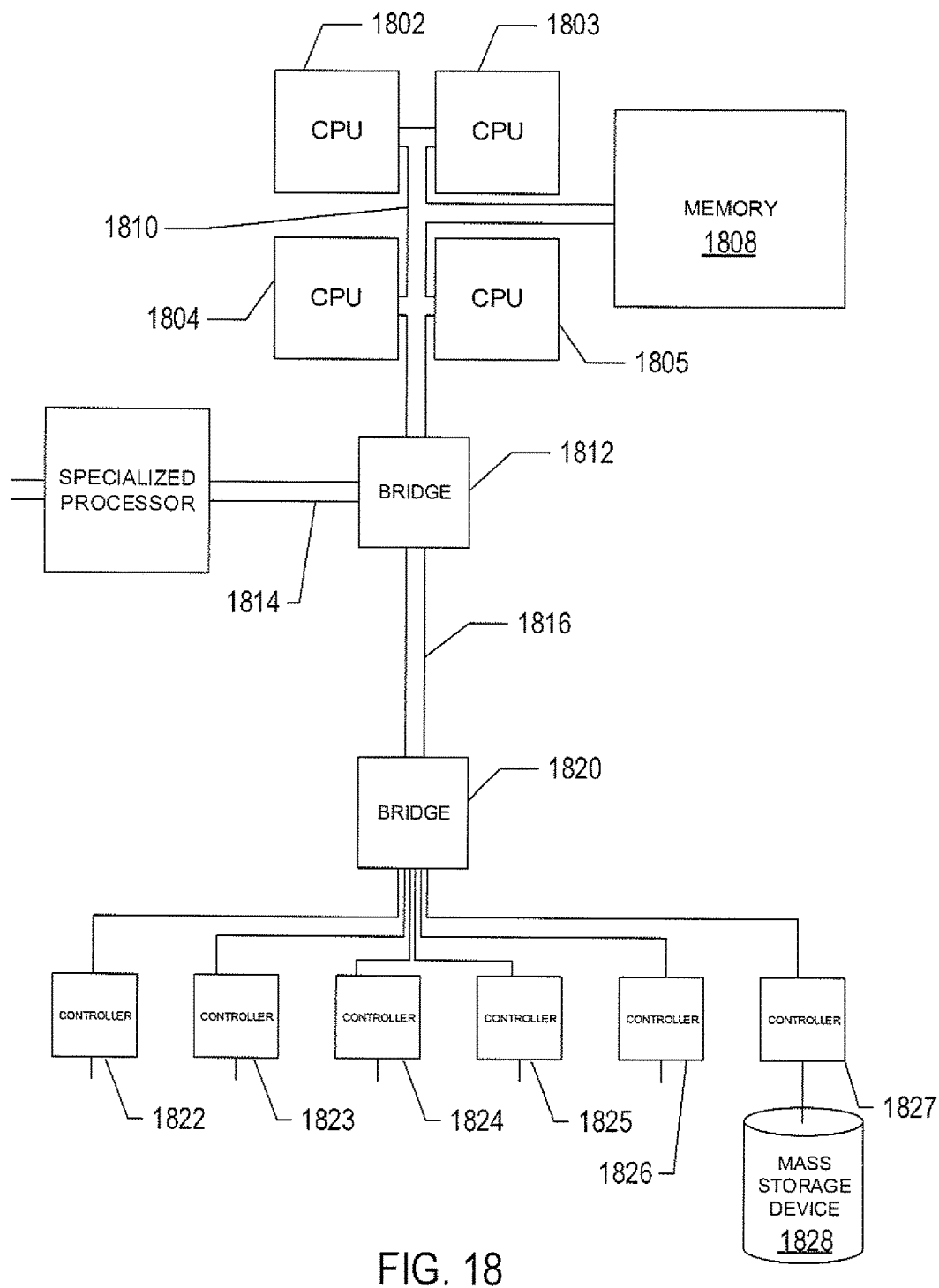
FIG. 18 shows an example of a computer system programmed to attenuate noise in near-continuously recorded seismic data.

FIG. 18 shows an example of a computer system programmed to attenuate noise in near-continuously recorded seismic data and therefore represents a seismic data processing system. The internal components of many small, mid-sized, and large computer systems as well as specialized processor-based storage systems may be described with respect to this generalized architecture, although each particular system may feature many additional components, subsystems, and similar, parallel systems with architectures similar to this generalized architecture. The computer system contains one or multiple central processing units ("CPUs") 1802-1805, one or more electronic memories 1808 interconnected with the CPUs by a CPU/memory-subsystem bus 1810 or multiple busses, a first bridge 1812 that interconnects the CPU/memory-subsystem bus 1810 with additional busses 1814 and 1816, or other types of high-speed interconnection media, including multiple, high-speed serial interconnects. The busses or serial interconnections, in turn, connect the CPUs and memory with specialized processors, such as a graphics processor 1818, and with one or more additional bridges 1820, which are interconnected with high-speed serial links or with multiple controllers 1822-1827, such as controller 1827, that provide access to various different types of computer-readable media, such as computer-readable medium 1828, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1828 is a data-storage device, including electronic memory, optical or magnetic disk drive, USB drive, flash memory and other such data-storage device. The computer-readable medium 1828 can be used to store machine-readable instructions that encode the computational methods described above and can be used to store encoded data, during store operations, and from which encoded data can be retrieved, during read operations, by computer systems, data-storage systems, and peripheral devices.

Figure 19:
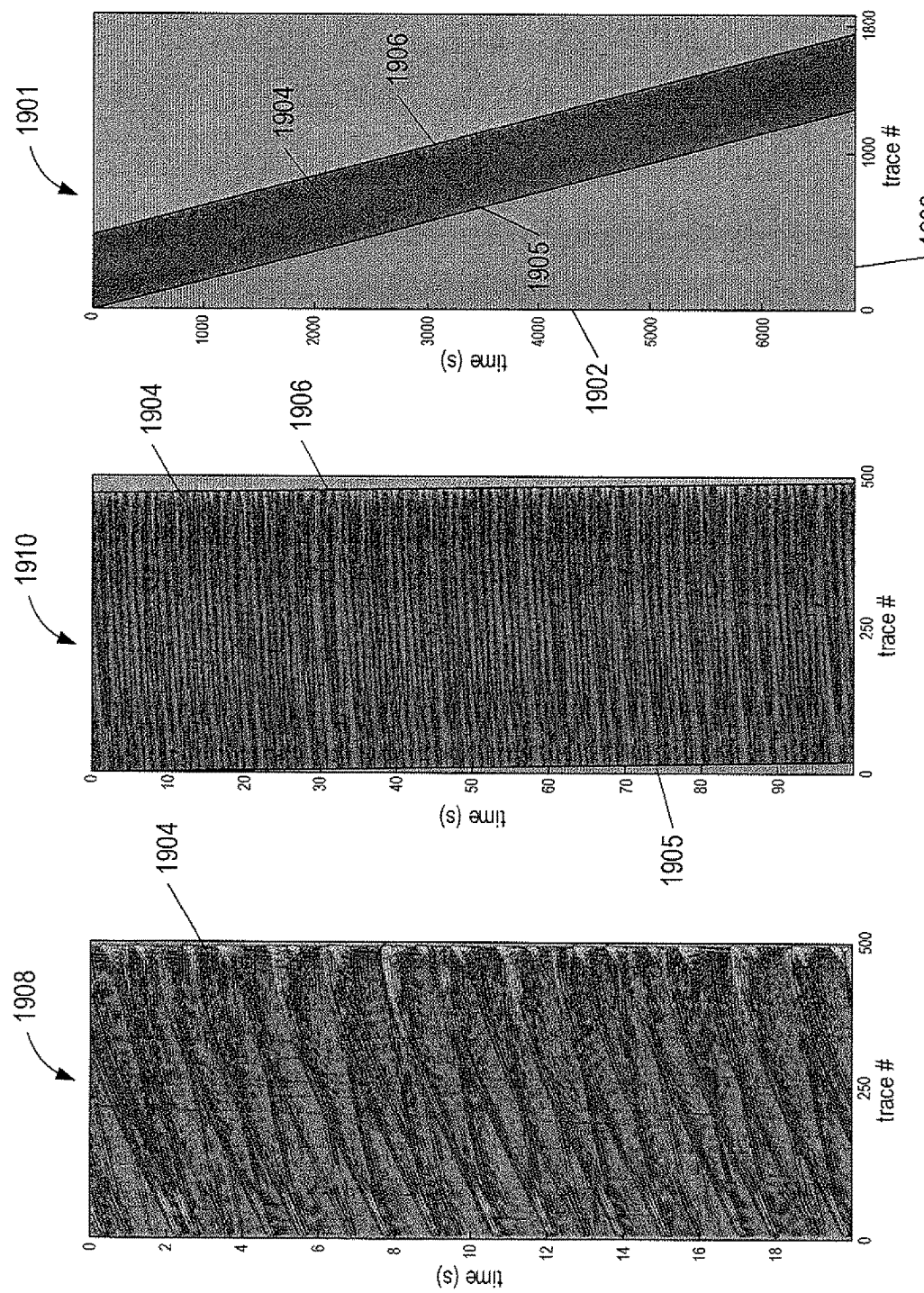
FIGS. 19-25 shows noise-attenuation methods applied to an actual near-continuously recorded pressure wavefield.

FIG. 19 shows an actual seismic-data record 1901 displayed as a near-continuous pressure wavefield in approximately stationary-receiver locations. The record 1901 has a time axis 1902 and a trace number axis 1903. The record 1901 was generated by near-continuously recording a pressure wavefield for 2 hours, 13 minutes, and 20 seconds using more than 1800 pressure sensors located along a moving streamer. The record 1901 was corrected for receiver motion using the in-line distance-correction operation of Equation (16) and displays the full near-continuous pressure wavefield in approximately stationary-receiver locations generated by pressure sensors located along a streamer that was towed along a linear vessel track. Shaded region 1904 represents actual pressure seismic data. Lines 1905 and 1906 are seismic data boundaries used to demarcate seismic data from no data outside the seismic data boundaries 1905 and 1906. Seismic-data records 1908 and 1910 contain the first 20 second and first 100 seconds of the seismic-data record 1901.

Figure 20:
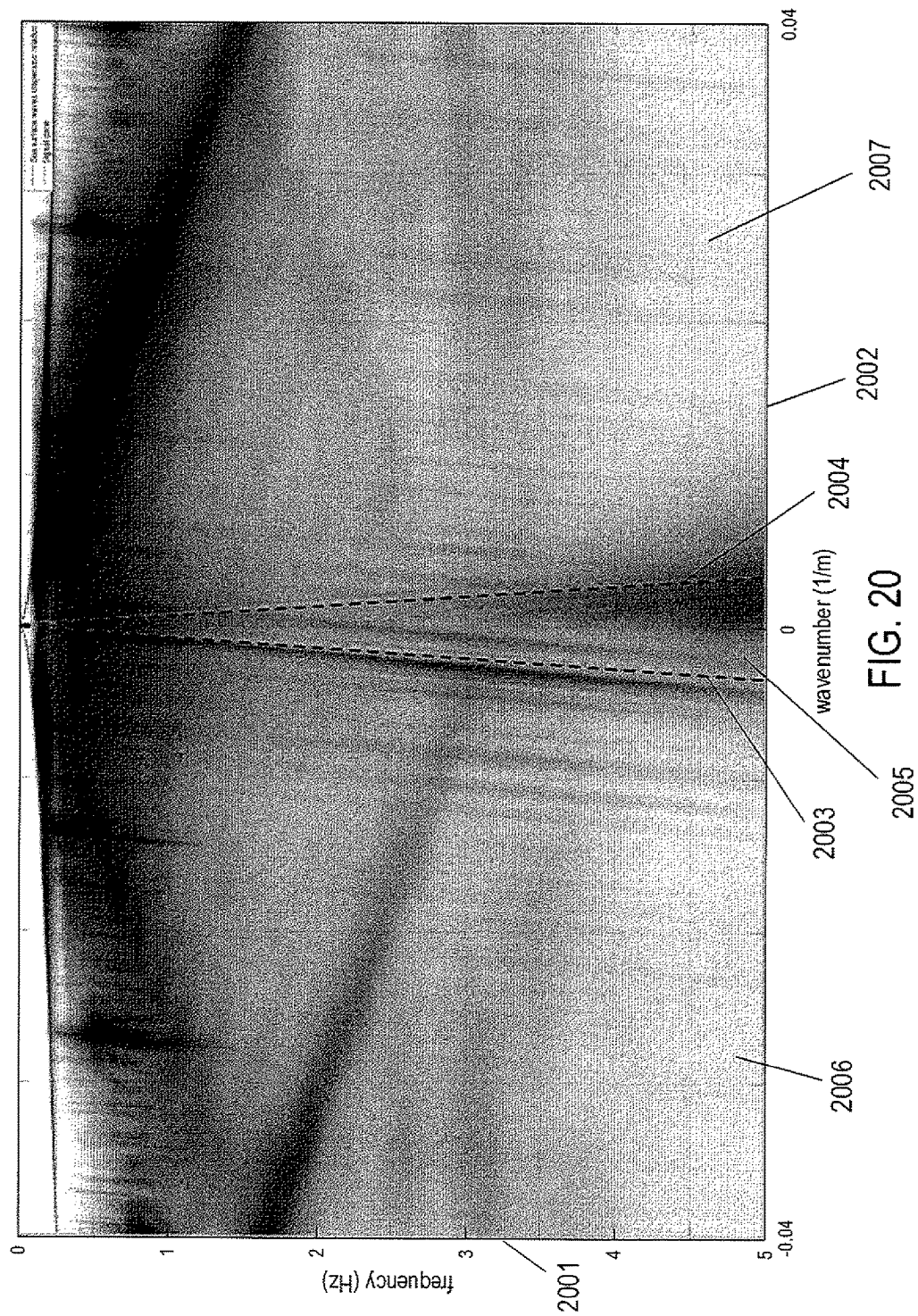

FIG. 20 shows a spectrum of the record 1901 transformed from the s-t domain to the k-f domain. Vertical axis 2001 represents angular frequency and horizontal axis 2002 represents a range of wavenumbers. Darker shading represents larger amplitudes and light shading represents smaller amplitudes. Dashed lines 2003 and 2004 represent boundaries of a signal region 2005. In FIG. 20, the spectrum is partitioned into the signal region 2005 and non-signal regions 2006 and 2007.

Figure 21:
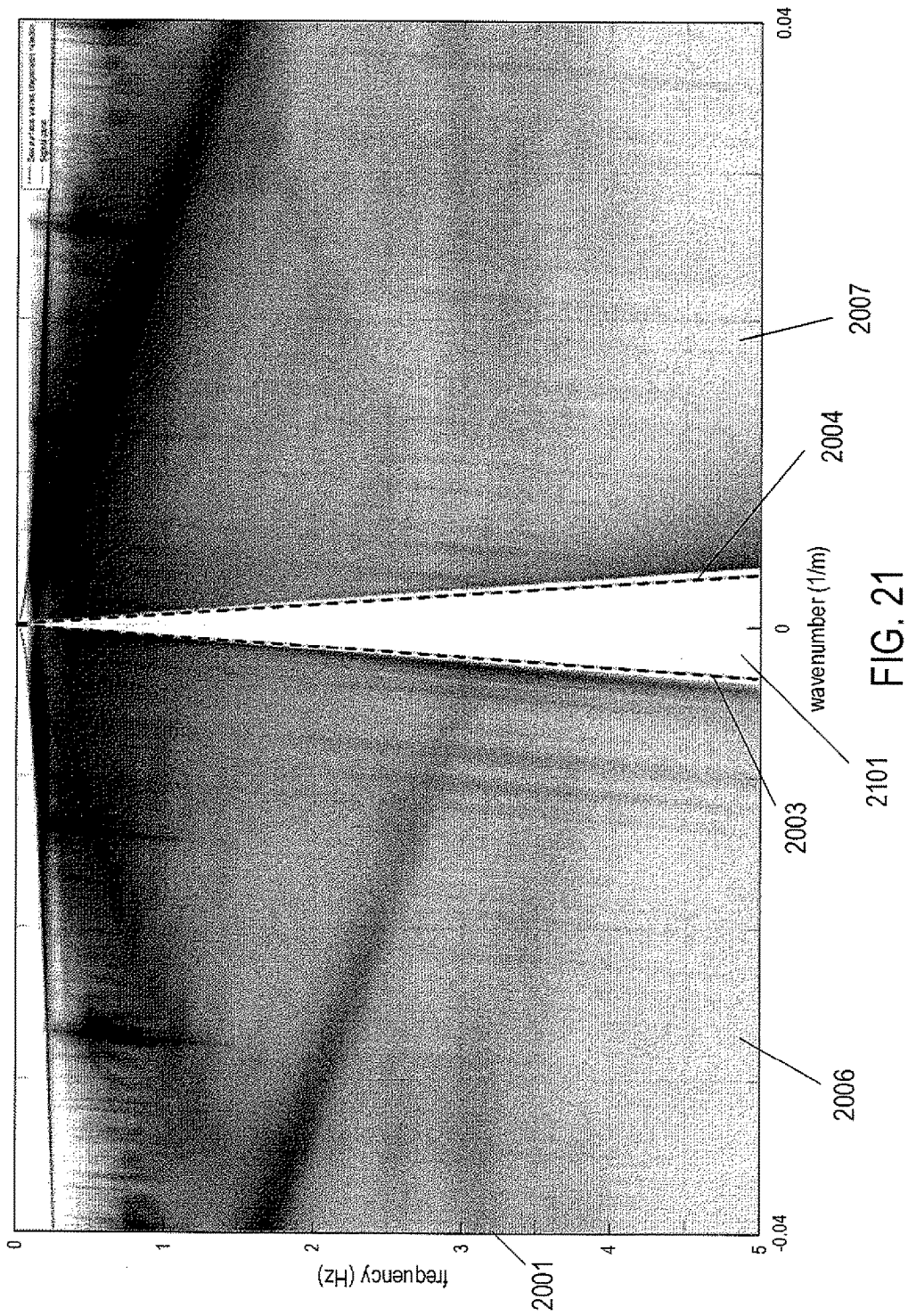

FIG. 21 shows a partial noise spectrum obtained by muting amplitudes in the signal region 2005 of the spectrum shown in FIG. 20. Unshaded triangle 2101 represents a muted signal region obtained by muting amplitudes in the signal region 2005.

Figure 22:
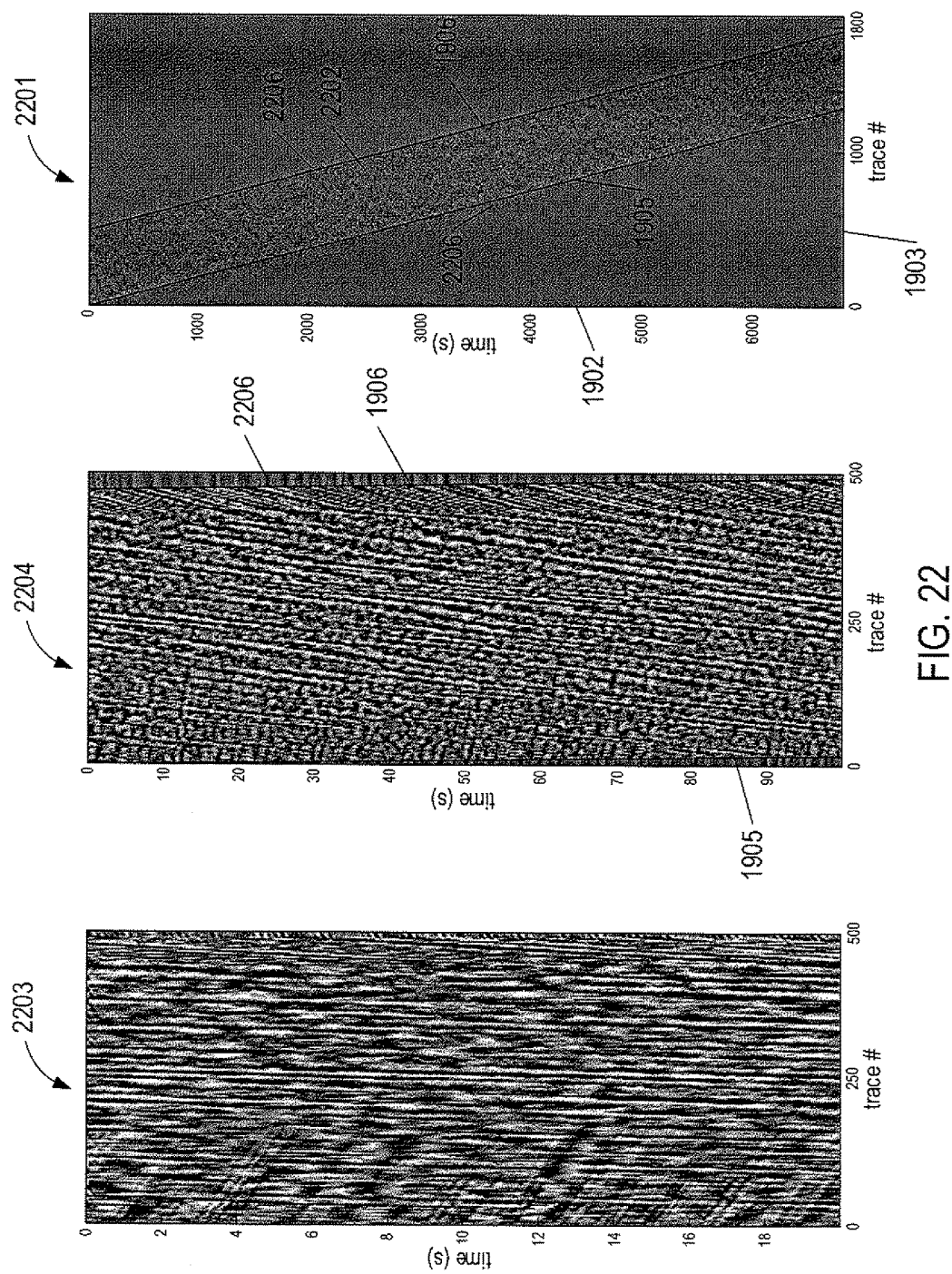

FIG. 22 shows an unbound noise model 2201 obtained as a result of transforming the partial noise spectrum of FIG. 19 from the k-f domain back to the s-t domain. Shaded region 2202 represents noise subcomponents contained in the non-signal regions 2006 and 2007 of FIG. 20 after transformation to the s-t domain. FIG. 22 also shows magnified views 2203 and 2204 that contain noise for the first 20 second and first 100 seconds, respectively, of the unbounded noise model 2201. Notice that energy has leaked beyond seismic data boundaries 1905 and 1906, which is especially observable as shading 2206 in unbounded noise model 2201 and magnified view 2204.

Figure 23:
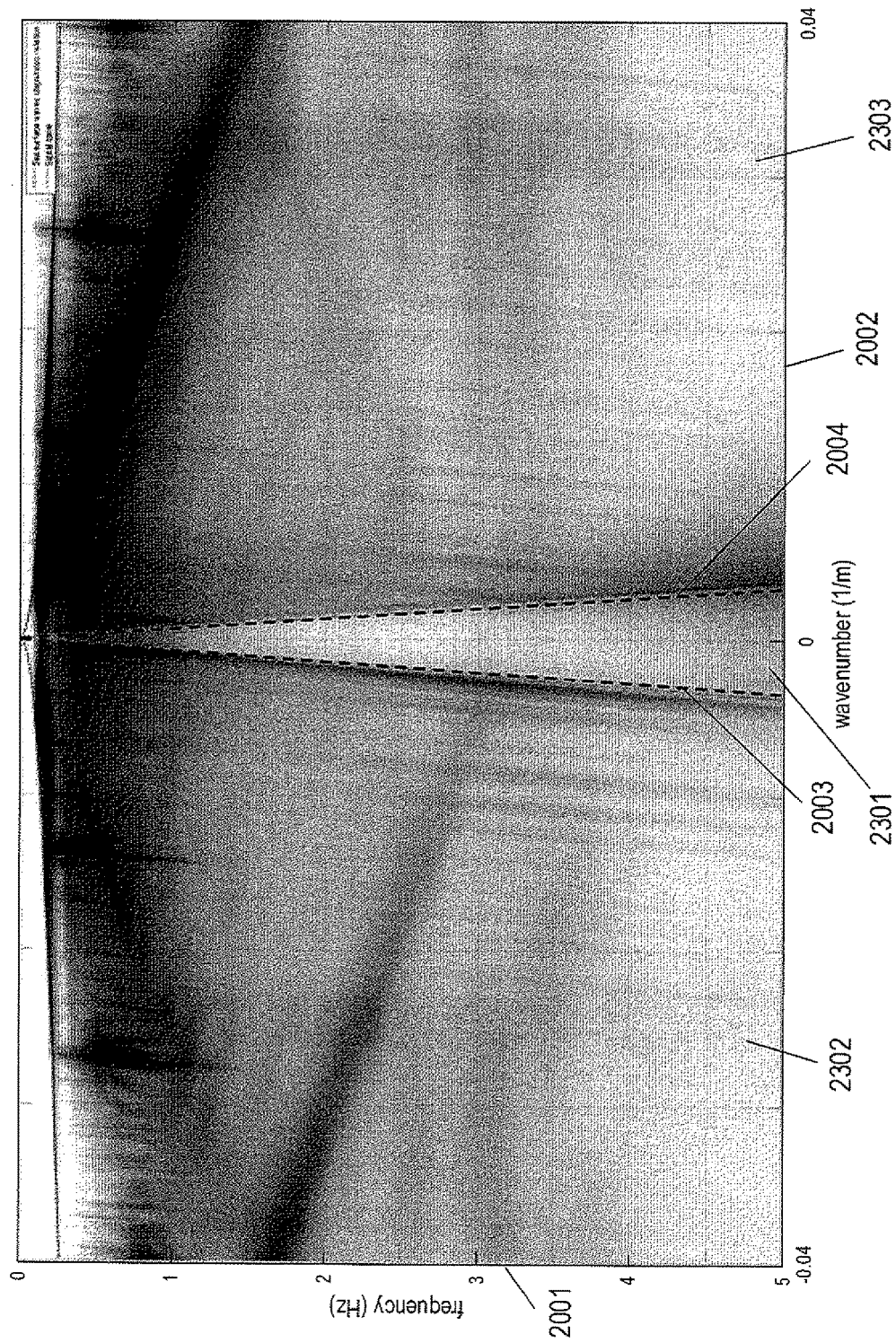

FIG. 23 shows a noise model spectrum obtained after first muting amplitudes outside the seismic data boundaries 1905 and 1906 of FIG. 22 followed by transforming from the s-t domain to the k-f domain. An interpolated signal region 2301 results from energy leaking from depleted non-signal regions 2302 and 2303. The noise model spectrum of FIG. 23 is then transformed from the k-f domain to the s-t domain, and the process described above with reference to FIG. 12 is repeated for 10 iterations.

Figure 24:
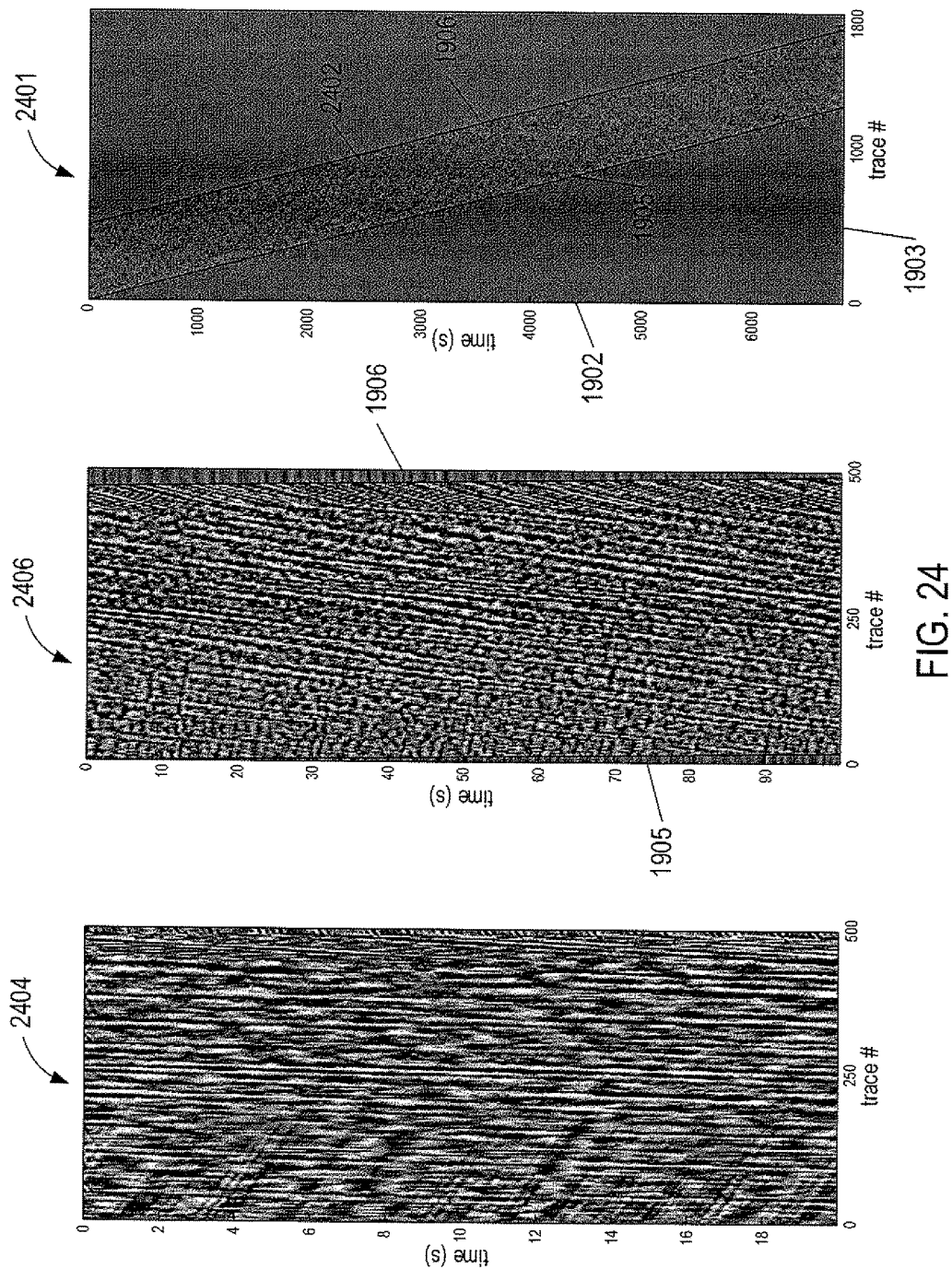

FIG. 24 shows an unbounded noise model 2401 obtained after 10 iterations of transforming back and forth between the s-t domain and the k-f domain and muting energy that leaks outside the seismic data boundaries 1905 and 1906 in the k-f domain. It should be noted that after 10 iterations little energy the noise 2402 has leaked beyond the seismic data boundaries 1905 and 1906. Seismic-data records 2404 and 2406 contain the first 20 second and first 100 seconds of the seismic-data record 2401.

Figure 25:
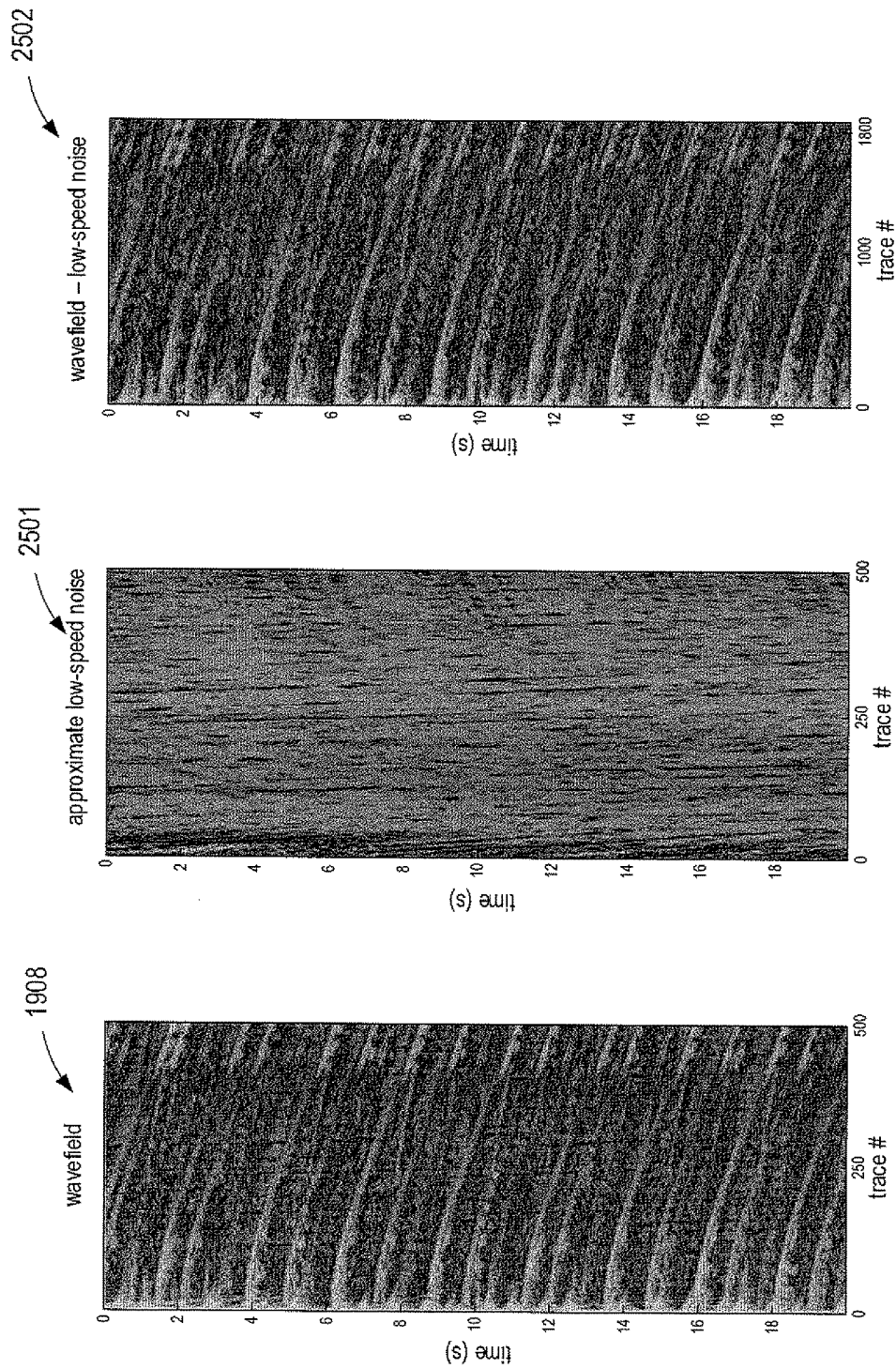

FIG. 25 shows subtraction of approximate low-speed noise 2501 of an approximate low-speed noise model obtained after 10 iterations from the near-continuous pressure wavefield 1908 in approximately stationary-receiver locations to a noise-attenuated near-continuous pressure wavefield in approximately stationary-receiver locations 2502. In order to illustrate actual changes, only the first 20 seconds of the approximate low-speed noise 2501, near-continuous pressure wavefield 1908, and noise-attenuated near-continuous pressure wavefield 2502 are displayed. The noise-attenuated near-continuous pressure wavefield in approximately stationary-receiver locations 2502 is obtained by subtracting the approximate low-speed noise 2501 from the near-continuous pressure wavefield 1908.

The mathematical formulas and gathers presented above are not, in any way, intended to mean or suggest an abstract idea or concept. The mathematical formulas and mathematical descriptions are used as a concise way of symbolically describing specific computational operations that may be performed on seismic data obtained from actual measuring devices (i.e., pressure sensors and particle motion sensors) deployed to measure actual wavefields generated during a marine survey. In general, the field of seismic data processing uses mathematical formulas and mathematical descriptions as a concise way of symbolically describing and representing computational operations performed on seismic data to yield useful information about the earth's interior. The mathematical formulas and methods described above are ultimately implemented on physical computer hardware, data-storage devices, and communications systems in order to obtain results that also represent physical and concrete concepts of the earth's interior. For example, as explained above, an actual pressure wavefield emanating from an actual subterranean formation after being illuminated with a source wavefield is composed of actual physical pressure waves that are sampled using physical and concrete pressure and particle motion sensors. The pressure sensors in turn produce electrical or optical signals that encode pressure data that represents the pressure wavefield and is physically recorded on data-storage devices and undergoes computational processing using hardware as describe above. The particle motion sensors in turn produce electrical or optical signals that encode particle displacement, velocity, or acceleration data that represents the particle displacement, velocity, or acceleration wavefield, respectively, and is physically recorded on data-storage devices and undergoes computational processing using hardware as describe above. A noise-attenuated near-continuous wavefield in approximately stationary-receiver locations may be subjected to further seismic data processing in order to interpret the physical structure and composition of the subterranean formation, such as in monitoring production of, or locating, an actual hydrocarbon deposit within the subterranean formation.

Any of the seismic data and processed seismic data, including near-continuous wavefields in approximately stationary-receiver locations and noise-attenuated near-continuous wavefields in approximately stationary-receiver locations, may form a geophysical data product indicative of certain properties of a subterranean formation. The geophysical data product may include processed seismic geophysical data and may be stored on a computer-readable medium as described above. The geophysical data product may be produced offshore (i.e. by equipment on the survey vessel 102) or onshore (i.e. at a computing facility on land) either within the United States or in another country. When the geophysical data product is produced offshore or in another country, it may be imported onshore to a data-storage facility in the United States. Once onshore in the United States, geophysical analysis may be performed on the data product.

Although the above disclosure has been described in terms of particular implementations, it is not intended that the disclosure be limited to these implementations. Modifications within the spirit of this disclosure will be apparent to those skilled in the art. For example, any of a variety of different implementations may be obtained by varying any of many different design and development parameters, including programming language, underlying operating system, modular organization, control structures, data structures, and other such design and development parameters. Thus, the present disclosure is not intended to be limited to the implementations shown herein but is to be accorded the widest scope consistent with the principles and novel features disclosed herein.

The invention claimed is:

1. A process for generating an image of a subterranean formation using marine seismic techniques in which two or more sources are activated to generate acoustic energy that is reflected from the subterranean formation and recorded by seismic sensors as seismic data, the specific improvement comprising:
   generating a sparse seismic-data matrix from the seismic data;
   transforming the sparse seismic-data matrix from a space-time domain to a transformation domain to generate a spectrum;
   determining a signal region of the spectrum;
   muting amplitudes in the signal region to generate a partial noise spectrum of the spectrum;
   iteratively determining a low-speed noise model based on the partial noise spectrum, the low-speed noise model includes noise that propagates at speeds less than the speed of sound in water and interpolated low-speed noise that represents noise affected by spatial aliasing and streamer irregularities;
   subtracting the low-speed noise model from the sparse seismic-data matrix to generate noise-attenuated sparse seismic-data matrix; and
   using the noise-attenuated sparse seismic-data matrix at least in part to generate an image of the subterranean information.

2. The process of claim 1, wherein the seismic data is near-continuously recorded seismic data.

3. The process of claim 2 further comprising correcting a near-continuously recorded seismic data for relative motion of receivers to generate a near-continuous wavefield in approximately stationary-receiver locations, wherein the sparse seismic-data matrix is the near-continuous wavefield in approximately stationary-receiver locations.

4. The process of claim 3, wherein correcting the near-continuously recorded seismic data for relative motion of receivers further comprises
   transforming the near-continuously recorded seismic data from the space-time domain to the time-wavenumber domain;
   computing a distance-correction operator based on receiver coordinates at start of a vessel track of a marine survey and a receiver coordinates at each sample time for each wavenumber, trace and time sample; and
   multiplying the distance-correction operator by each time sample of a trace of the near-continuous wavefield in the time-wavenumber domain to obtain a near-continuous wavefield in approximately stationary-receiver locations in the time-wavenumber domain; and
   transforming the near-continuous wavefield in approximately stationary-receiver locations to the space-time domain.

5. The process of claim 1 further comprising padding a gather of seismic data recorded in a shot record with zero-amplitude time samples to generate a padded gather, wherein the sparse seismic-data matrix is the padded gather.

6. The process of claim 1, wherein computing the spectrum of the sparse seismic-data matrix further comprises transforming the sparse seismic-data matrix from the space-time domain to one of a wavenumber-frequency domain, curvelet domain, and polar coordinate domain.

7. The process of claim 1, wherein determining the signal region further comprises partitioning the spectrum into a signal region and a non-signal region, the signal region corresponds to signal and noise subcomponents that propagate at speeds greater than or equal to the speed of sound in water and the non-signal corresponds to low-speed noise that propagates at speeds less than the speed of sound in water.

8. The process of claim 1, wherein muting amplitudes in the signal region of the spectrum further comprises assigning a zero value to each amplitude that lies within the signal region.

9. The process of claim 1, wherein iteratively determining the low-speed noise model based on the partial noise spectrum further comprises:
 for a fixed number of iterations,
  transforming the partial noise spectrum to the space-time domain to generate an unbounded low-speed noise model;
  muting amplitudes of the unbounded low-speed noise model outside seismic-data boundaries of the sparse seismic-data matrix to obtain the low-speed noise model;
  outputting the low-speed noise model when the final iteration is reached;
  transforming the low-speed noise model to a transformation domain to obtain the interpolated low-speed noise of the signal region; and
  replacing amplitudes outside signal region with amplitudes of the spectrum to generate a corrected low-speed noise model spectrum.

10. The process of claim 1, wherein iteratively determining the low-speed noise model based on the partial noise spectrum further comprises:
 repeatedly,
  transforming the partial noise spectrum to the space-time domain to generate an unbounded low-speed noise model;
  compute acoustic energy of amplitudes outside seismic data boundaries of the unbounded low-speed noise model;
  muting amplitudes of the unbounded low-speed noise model outside seismic-data boundaries of the sparse seismic-data matrix to obtain the low-speed noise model;
  outputting the low-speed noise model when acoustic energy is below a threshold;
  transforming the low-speed noise model to a transformation domain to obtain the interpolated low-speed noise of the signal region,
  replacing amplitudes outside signal region with amplitudes of the spectrum to generate a corrected low-speed noise model spectrum.

11. The process of claim 1 executed on a programmable computer programmed to execute the method.

12. The process of claim 1 further comprises storing the gather of approximate vertical particle velocity wavefield data in one or more data-storage devices.

13. The process of claim 1, wherein the seismic data and noise-attenuated sparse seismic-data matrix form a geophysical data product, further comprising recording the geophysical data product on a physical, non-volatile computer-readable medium suitable for importing onshore.

14. The process of claim 13, further comprising performing geophysical analysis onshore on the geophysical data product.

15. A computer system that attenuates noise in seismic data, the system comprising:
 one or more processors;
 one or more data-storage devices; and
 a computer-readable medium stored in one or more of data-storage devices that when executed by the one or more processors controls the system to carry out
  generating a sparse seismic-data matrix from the seismic data;
  transforming the sparse seismic-data matrix from a space-time domain to a transformation domain to generate a spectrum;
  determining a signal region of the spectrum;
  muting amplitudes in the signal region to generate a partial noise spectrum of the spectrum;
  iteratively determining a low-speed noise model based on the partial noise spectrum, the low-speed noise model includes noise that propagates at speeds less than the speed of sound in water and interpolated low-speed noise that represents noise affected by spatial aliasing and streamer irregularities;
  subtracting the low-speed noise model from the sparse seismic-data matrix to generate noise-attenuated sparse seismic-data matrix; and
 using the noise-attenuated sparse seismic-data matrix at least in part to generate an image of the subterranean information.

16. The system of claim 15, wherein the seismic data is near-continuously recorded seismic data.

17. The system of claim 16 further comprising correcting a near-continuously recorded seismic data for relative motion of receivers to generate a near-continuous wavefield in approximately stationary-receiver locations, wherein the sparse seismic-data matrix is the near-continuous wavefield in approximately stationary-receiver locations.

18. The system of claim 17, wherein correcting the near-continuously recorded seismic data for relative motion of receivers further comprises
 transforming the near-continuously recorded seismic data from the space-time domain to the time-wavenumber domain;
 computing a distance-correction operator based on receiver coordinates at start of a vessel track of a marine survey and a receiver coordinates at each sample time for each wavenumber, trace and time sample; and
 multiplying the distance-correction operator to each time sample of a trace of the near-continuous wavefield in the time-wavenumber domain to obtain a near-continuous wavefield in approximately stationary-receiver locations in the time-wavenumber domain; and
 transforming the near-continuous wavefield in approximately stationary-receiver locations to the space-time domain.

19. The system of claim 15 further comprising padding a gather of seismic data recorded in a shot record with zero-amplitude time samples to generate a padded gather, wherein the sparse seismic-data matrix is the padded gather.

20. The system of claim 15, wherein computing the spectrum of the sparse seismic-data matrix further comprises transforming the sparse seismic-data matrix from the space-time domain to one or a wavenumber-frequency domain, curvelet domain, and polar coordinate domain.

21. The system of claim 15, wherein determining the signal region further comprises partitioning the spectrum into a signal region and a non-signal region, the signal region corresponding to signal and noise subcomponents that propagate at speeds greater than or equal to the speed of sound in water and the non-signal corresponding to low-speed noise that propagates at speeds less than the speed of sound in water.

22. The system of claim 15, wherein muting amplitudes in the signal region of the spectrum further comprises assigning a zero value to each amplitude that lies within the signal region.

23. The system of claim 15, wherein iteratively determining the low-speed noise model based on the partial noise spectrum further comprises:
transforming the partial noise spectrum to the space-time domain to generate a first unbounded low-speed noise model;
for a fixed number of iterations,
muting amplitudes of the unbounded low-speed noise model outside seismic-data boundaries of the sparse seismic-data matrix to obtain the low-speed noise model,
transforming the low-speed noise model to a transformation domain to obtain the interpolated low-speed noise of the signal region, and
combining the interpolate low-speed noise of the signal region with non-signal regions of the spectrum to generate a corrected low-speed noise model spectrum;
transforming the corrected low-speed noise model spectrum to the transformation to generate a second unbounded low-speed noise model; and
outputting the low-speed noise model when the final iteration is reached.

24. The system of claim 15, wherein iteratively determining the low-speed noise model based on the partial noise spectrum further comprises:
transforming the partial noise spectrum to the space-time domain to generate a first unbounded low-speed noise model;
repeatedly,
muting amplitudes of the unbounded low-speed noise model outside seismic-data boundaries of the sparse seismic-data matrix to obtain the low-speed noise model,
transforming the low-speed noise model to a transformation domain to obtain the interpolated low-speed noise of the signal region, and
combining the interpolate low-speed noise of the signal region with non-signal regions of the spectrum to generate a corrected low-speed noise model spectrum;
transforming the corrected low-speed noise model spectrum to the transformation to generate a second unbounded low-speed noise model; and
outputting the low-speed noise model when energy of amplitudes outside seismic-data boundaries is below a threshold.

25. A non-transitory computer-readable medium having machine-readable instructions encoded thereon for enabling one or more processors of a computer system to perform the operations of
generating a sparse seismic-data matrix from seismic data;
transforming the sparse seismic-data matrix from a space-time domain to a transformation domain to generate a spectrum;
determining a signal region of the spectrum;
muting amplitudes in the signal region to generate a partial noise spectrum of the spectrum;
iteratively determining a low-speed noise model based on the partial noise spectrum, the low-speed noise model includes noise that propagates at speeds less than the speed of sound in water and interpolated low-speed noise that represents noise affected by spatial aliasing and streamer irregularities;
subtracting the low-speed noise model from the sparse seismic-data matrix to generate noise-attenuated sparse seismic-data matrix; and
using the noise-attenuated sparse seismic-data matrix at least in part to generate an image of the subterranean information.

26. The medium of claim 25, wherein the seismic data is near-continuously recorded seismic data.

27. The medium of claim 26 further comprising correcting a near-continuously recorded seismic data for relative motion of receivers to generate a near-continuous wavefield in approximately stationary-receiver locations, wherein the sparse seismic-data matrix is the near-continuous wavefield in approximately stationary-receiver locations.

28. The medium of claim 27, wherein correcting the near-continuously recorded seismic data for relative motion of receivers further comprises
transforming the near-continuously recorded seismic data from the space-time domain to the time-wavenumber domain;
computing a distance-correction operator based on receiver coordinates at start of a vessel track of a marine survey and a receiver coordinates at each sample time for each wavenumber, trace and time sample; and
multiplying the distance-correction operator to each time sample of a trace of the near-continuous wavefield in the time-wavenumber domain to obtain a near-continuous wavefield in approximately stationary-receiver locations in the time-wavenumber domain; and
transforming the near-continuous wavefield in approximately stationary-receiver locations to the space-time domain.

29. The medium of claim 25 further comprising padding the seismic data with zero-amplitude time samples to generate a padded gather, wherein the sparse seismic-data matrix is the padded gather.

30. The medium of claim 25, wherein computing the spectrum of the sparse seismic-data matrix further comprises transforming the sparse seismic-data matrix from the space-time domain to one or a wavenumber-frequency domain, curvelet domain, and polar coordinate domain.

31. The medium of claim 25, wherein determining the signal region further comprises partitioning the spectrum into a signal region and a non-signal region, the signal region corresponding to signal and noise subcomponents that propagate at speeds greater than or equal to the speed of sound in water and the non-signal corresponding to low-speed noise that propagates at speeds less than the speed of sound in water.

32. The medium of claim 25, wherein muting amplitudes in the signal region of the spectrum further comprises assigning a zero value to each amplitude that lies within the signal region.

33. The medium of claim 25, wherein iteratively determining the low-speed noise model based on the partial noise spectrum further comprises:
transforming the partial noise spectrum to the space-time domain to generate a first unbounded low-speed noise model;
for a fixed number of iterations, muting amplitudes of the unbounded low-speed noise model outside seismic-data boundaries of the sparse seismic-data matrix to obtain the low-speed noise model, transforming the low-speed noise model to a transformation domain to obtain the interpolated low-speed noise of the signal region, and combining the interpolate low-speed noise of the signal region with non-signal regions of the spectrum to generate a corrected low-speed noise model spectrum;

transforming the corrected low-speed noise model spectrum to the transformation to generate a second unbounded low-speed noise model; and outputting the low-speed noise model when the final iteration is reached.

34. The medium of claim 25, wherein iteratively determining the low-speed noise model based on the partial noise spectrum further comprises:

transforming the partial noise spectrum to the space-time domain to generate a first unbounded low-speed noise model;

repeatedly, muting amplitudes of the unbounded low-speed noise model outside seismic-data boundaries of the sparse seismic-data matrix to obtain the low-speed noise model, transforming the low-speed noise model to a transformation domain to obtain the interpolated low-speed noise of the signal region, and combining the interpolate low-speed noise of the signal region with non-signal regions of the spectrum to generate a corrected low-speed noise model spectrum;

transforming the corrected low-speed noise model spectrum to the transformation to generate a second unbounded low-speed noise model; and outputting the low-speed noise model when energy of amplitudes outside seismic-data boundaries is below a threshold.

35. A process for generating an image of a subterranean formation using marine seismic techniques in which two or more sources are activated to generate acoustic energy that is reflected from the subterranean formation and recorded by seismic sensors as seismic data, the specific improvement comprising:

generating a sparse seismic-data matrix from near-continuously recorded seismic data;

transforming the sparse seismic-data matrix from a space-time domain to a transformation domain to generate a spectrum;

determining a signal region of the spectrum;

muting amplitudes in the signal region to generate a partial noise spectrum of the spectrum;

iteratively determining a low-speed noise model based on the partial noise spectrum, the low-speed noise model includes noise that propagates at speeds less than the speed of sound in water and interpolated low-speed noise that represents noise affected by spatial aliasing and streamer irregularities;

subtracting the low-speed noise model from the sparse seismic-data matrix to generate noise attenuated sparse seismic-data matrix; and using the noise-attenuated sparse seismic-data matrix at least in part to generate an image of the subterranean information.

* * * * *